United States Patent [19]

Inadome et al.

[11] Patent Number: 5,699,198
[45] Date of Patent: Dec. 16, 1997

[54] INTERNAL FOCUSING ZOOM LENS SYSTEM

[75] Inventors: Kiyotaka Inadome, Kawasaki; Wataru Tatsuno, Yokohama, both of Japan

[73] Assignee: Nikon Corporation, Tokyo, Japan

[21] Appl. No.: 481,216

[22] Filed: Jun. 7, 1995

Related U.S. Application Data

[63] Continuation of Ser. No. 106,896, Aug. 16, 1993, abandoned.

[30] Foreign Application Priority Data

Aug. 28, 1992 [JP] Japan ..................... 4-229000

[51] Int. Cl.⁶ .................................................. G02B 15/14
[52] U.S. Cl. ..................... 359/684; 359/685; 359/687
[58] Field of Search ........................... 359/687, 684, 359/685

[56] References Cited

U.S. PATENT DOCUMENTS

| | | | |
|---|---|---|---|
| 5,000,551 | 3/1991 | Shibayama | 359/687 |
| 5,018,843 | 5/1991 | Inadome et al. | 359/687 |
| 5,144,488 | 9/1992 | Endo et al. | 359/686 |
| 5,191,476 | 3/1993 | Sato | 359/687 |
| 5,241,420 | 8/1993 | Yamanashi | 359/684 |
| 5,412,507 | 5/1995 | Sato | 359/687 |

FOREIGN PATENT DOCUMENTS 4-140704   5/1992   Japan.

*Primary Examiner*—Scott J. Sugarman
*Attorney, Agent, or Firm*—Shapiro and Shapiro

[57] ABSTRACT

An internal focusing zoom lens comprises a first lens group of positive refracting power, a second lens group of negative refracting power, a third lens group of positive refracting power and a fourth lens group of positive refracting power disposed in the named order from the object side, in which at least the first lens group, the third lens group and the fourth lens group move toward an object along the optical axis during zooming from wide angle to telephoto such that an air gap increases between the first lens group and the second lens group, an air gap decreases between the second lens group and the third lens group and an air gap decreases between the third lens group and the fourth lens group, in which the second lens group moves toward the object along the optical axis during focusing, and which satisfies various conditions.

22 Claims, 5 Drawing Sheets

INTERNAL FOCUSING ZOOM LENS SYSTEM

This is a continuation of application Ser. No. 08/106,896, filed Aug. 16, 1993, now abandoned.

BACKGROUND OF THE INVENTION

1. Field of the Invention

The present invention relates to a zoom lens, and more particularly to an internal focusing zoom lens.

2. Related Background Art

There are recently studied various focusing methods for enabling the size reduction of focusing lens group in addition to the size reduction and the pursuit of high performance of zoom lens with spread of autofocus of camera lens. However, if a compact wide ratio zoom lens includes a compact focusing lens group in simple focusing method, a change in aberration upon focusing is great, and performance in short distance photographing is always sacrificed. On the other hand, if the focusing lens group is relatively compact with high performance in short distance photographing, the focusing method is complex in contrast.

For example, Japanese Laid-open Patent Application No. 3-228008 employs the zoom method with four lens groups, e.g., positive, negative, positive and negative lens groups, in which upon zooming from wide angle to telephoto an air gap increases between first lens group and second lens group, an air gap decreases between second lens group and third lens group, and an air gap increases between third lens group and fourth lens group. Thus, the introduction of focusing method using the second lens group did not result in achievement of sufficient size reduction and correction of aberration change.

Further, Japanese Laid-open Patent Application No. 4-140704 tried to achieve the size reduction by employing the zoom method with four lens groups, e.g., positive, negative, positive and positive lens groups, in which all the lens groups move toward an object upon zooming from wide angle to telephoto such that an air gap increases between first lens group and second lens group, an air gap decreases between second lens group and third lens group, and an air gap decreases between third lens group and fourth lens group. However, it failed to study the optimum power arrangement for the respective lens groups, which resulted in a great change of total length upon zooming from wide angle to telephoto. Thus, the application failed to achieve an optical system compact in size and less sensitive to eccentricity.

SUMMARY OF THE INVENTION

It is, therefore, an object of the present invention to provide an internal focusing zoom lens, which is compact in size and wide in variable power, in which a focusing lens group is very small and a focusing method is very simple, and which is always excellent in imaging property in the entire photographic range from infinity to the closest distance.

The present invention is based on the study of optimum power arrangement, which found an internal zoom lens having a compact zoom lens system in total and a very small work (weight×displacement amount) for focusing by focusing lens group. Specifically, as shown in FIG. 1, an internal focusing zoom lens system of the present invention comprises in order from the object side a first lens group G1 of positive refracting power, a second lens group G2 of negative refracting power, a third lens group G3 of positive refracting power, and a fourth lens group G4 of positive refracting power, in which upon zooming from wide angle to telephoto at least the first lens group G1, the third lens group G3, and the fourth lens group G4 move toward an object such that an air gap increases between the first lens group G1 and the second lens Group G2, an air gap decreases between the second lens Group G2 and the third lens group G3, and an air gap decreases between the third lens group G3 and the fourth lens group G4, and in which upon focusing the second lens group G2 moves toward the object and the following conditions are satisfied;

$$3.0 < f_1/-f_2 < 6.0 \tag{1};$$

$$2.2 < -f_2/f_w^{1/2} < 3.3 \tag{2};$$

$$15.0 < f_1^2 \cdot \beta_{2w}^2/(1-\beta_{2w}^2) \cdot f_w < 35.0 \tag{3};$$

where $f_1$: a focal length of the first lens group G1;

$f_2$: a focal length of the second lens group G2;

$\beta_{2w}$: a lateral magnification of the second lens group G2 at the wide angle end to infinity;

$f_w$: a focal length of the overall system at wide angle end.

In the present invention, a wide ratio standard zoom lens employs the zoom system with four lens groups, e.g., positive, negative, positive and positive lens groups, compact in size and relatively simple in structure, in which upon focusing the compact and light second lens group is moved toward the object along the optical axis to effect focusing onto the object in short distance. It is generally better in order to suppress the aberration change upon the object distance that the lens groups are respectively corrected in aberration and that the focusing lens group has a small displacement amount for focusing and a small positional change of rays passing therethrough during movement of the focusing lens group. The present invention succeeded to minimize the aberration change upon the object distance with suppressed displacement for focusing of the second lens group, which is the focusing lens group, based on the study on the optimum power arrangement and shapes of the lens groups. Therefore, compact and high-performance internal focusing zoom lenses may be attained irrespective of states of zooming or focusing.

The conditions in the present invention will be described in the following.

Condition (1) shows the optimum ratio of focal lengths between the first lens group G1 and the second lens group G2 in zoom lens according to the present invention. If a zoom lens is arranged as in the present invention such that the first lens group G1 moves along the optical axis upon zooming from wide angle to telephoto, a longer focal length $f_1$ is more advantageous for aberration correction, but a change of total length increases upon zooming. Regarding the lateral magnification $\beta_2$ of the second lens group G2 to an object at infinity, the lateral magnification $\beta_2$ (more strictly, an absolute value thereof) decreases as the refracting power of first lens group G1 becomes lower (as the focal length $f_1$ becomes longer) or as the refracting power of second lens group G2 becomes higher. Let a feed amount for focusing by the second lens group be $\Delta X$, a photographic distance be R, and the total length of lens system (a distance from the tip end of lens system to the film plane) be TL. Then, the feed amount $\Delta X$ may be generally expressed by the following approximation.

$$\Delta X = f_1^2/(1/\beta_2^2 - 1) \cdot (R - TL - f_1) \tag{a}$$

From the above equation, the approximation, $R-TL-f_1 \cong R$, holds with sufficiently large R. With fixed photographic distance R, the feed amount $\Delta X$ is substantially proportional only to $f_1^2/(1/\beta_2^2-1)$. Accordingly, the following equation is defined as Equation (b).

$$Y=f_1^2/(1/\beta_2^2-1) \qquad (b)$$

As seen from the above equation, the feed amount $\Delta X$ for focusing may be made smaller as $\beta_2^2$ becomes smaller as $\beta_2^2 \to 0$. The magnification $\beta_2$ is a function of $f_1$ as expressed by Equation (c) with a distance $D_1$ between principal points of the first lens group G1 and the second lens group G2.

$$\beta_2=f_2/(f_1+f_2-D_1) \qquad (c)$$

Using Equation (c), Equation (b) may be changed as follows.

$$Y=f_1^2 f_2^2/\{(f_1+f_2-D_1)^2-f_2^2\} \qquad (d)$$

Differentiating Equation (d) with respect to $f_1$ and changing its form, Equation (e) is obtained.

$$dY/df_1=2f_1 f_2^2\{(f_1+f_2-D_1)(f_2-D_1)-f_2^2\}/\{(f_1+f_2-D_1)^2-f_2^2\}^2 \qquad (e)$$

Since $f_1>0$ and $D_1>0$, $$\{(f_1+f_2-D_1)^2-f_2^2\}^2>0 \qquad (f);$$

$$f_1 f_2^2>0 \qquad (g).$$

In four lens group zoom systems with positive, negative, positive and positive lens groups as in the present invention, the condition, $-1<\beta_2<0$, must be satisfied in order to enable the focusing by the second lens group in the entire zooming range from wide angle to telephoto. Then, the following condition holds from Equation (c), considering $f_2<0$.

$$(f_1+f_2-D_1)>0$$

Further, since $D_1>0$, $(f_2-D_1)<0$. Then, $$(f_1+f_2-D_1)(f_2-D_1)<0.$$

Accordingly, Equation (h) holds.

$$(f_1+f_2-D_1)(f_2-D_1)-f_2^2<0 \qquad (h)$$

From Equations (f), (g) and (h), Equation (e) is always negative, that is, $dY/df_1<0$. In other words, Equation (d) is a monotone decreasing function with respect to $f_1$. It is thus seen from the above discussion that the feed amount $\Delta X$ for focusing by the second lens group decreases as $f_1$ increases. In summary, $\Delta X$ decreases as the value of $f_1$ increases or as the absolute value of $f_2$ decreases. Accordingly, Condition (1) can be said as a conditional equation for defining the feed amount $\Delta X$ for focusing. In other words, Condition (1) allows a zoom lens to assure the high performance at any photographic distance between the infinity and the shotest photographic distance while keeping the optical system compact. Below the lower limit of Condition (1), the feed amount $\Delta X$ of second lens group for focusing becomes greater, which makes it difficult to suppress the aberration change upon the object distance within a limited range. Above the upper limit of Condition (1), the feed amount $\Delta X$ for focusing can be kept small, but the change of total length upon zooming becomes greater, especially if the refracting power of first lens group G1 is low, which is likely to show the eccentricity in respect of mechanical design. On the contrary, if the refracting power of second lens group G2 is high, the aberration correction becomes difficult.

Condition (2) is a conditional equation for realizing a high-performance zoom lens while keeping the optical system compact. Below the lower limit of Condition (2), the refracting power of second lens group G2 becomes higher, which makes the aberration correction difficult. Above the upper limit of Condition (2), the refracting power of first lens group G1 must be lowered to satisfy Condition (1), which increases the change of total length upon zooming. This makes it impossible to realize a compact optical system less sensitive to eccentricity.

Condition (3) is for defining the feed amount $\Delta X$ for focusing by the second lens group especially at wide angle end, as seen from the expression of Equation (b). Below the lower limit of Condition (3), the feed amount $\Delta X$ at wide angle end can be made very small, but a power ratio between the first lens group G1 and the second lens group G2 becomes greater, which makes the aberration correction difficult and increases the size of entire lens system. Above the upper limit of Condition (3), the feed amount $\Delta X$ at wide angle end becomes greater, which makes it difficult to suppress the aberration change upon object distance. Further, if a zoom lens system has a large zoom ratio, focusing becomes impossible at telephoto end.

In addition, the following condition should be preferably satisfied in order to achieve further size reduction and superior performance in the above arrangement.

$$0.8<f_4/f_3<3.0 \qquad (4)$$

In Equation (4), $f_3$: a focal length of the third lens group G3;

$f_4$: a focal length of the fourth lens group G4.

Condition (4) shows the optimum ratio of focal lengths between the third lens group G3 and the fourth lens group G4 in zoom lens according to the present invention, specifically which greatly concerns the size of entire lens system and the aberration change correction upon zooming. In the range satisfying Condition (4), a zoom lens according to the present invention is so arranged that the third lens group G3 and the fourth lens group G4 are nearly afocal to an object at infinity on optical axis in the zooming of from wide angle to telephoto. Thus, changing the gap between them depending upon the condition of zooming can produce the effect of so-called floating, achieving a high-performance zoom lens less in aberration change upon zooming. Below the lower limit of condition (4), the total length of lens system becomes greater, and the nearly afocal arrangement of the third lens group G3 and the fourth lens group G4 is destroyed to make the reduction of aberration change upon zooming difficult. Above the upper limit of Condition (4), the nearly afocal arrangement is broken and the back focus is decreased, which makes impossible to construct a zoom lens as one for single-lens reflex camera. The effect of the present invention will be further enhanced if the lower limit is 1.0 and the upper limit is 2.0 in Condition (4).

If a zoom lens system is arranged to carry out focusing with second lens group, as in the present invention, the feed amount for focusing generally changes depending upon zooming. Then, a zoom lens system needing the so-called manual focus requires a special structure for enabling it. The cam structure on lens barrel for determining zooming and focusing functions of zoom lens System according to the present invention is preferably constructed as proposed in Japanese Patent Application No. 3-304887 filed by the same assignee as the present invention. In more detail, the zoom lens system according to the present invention is so arranged that if a certain movement locus for zooming is expressed with a variable of rotation angle of rotational barrel for defining a movement amount along the optical axis of the lens groups, a movement locus of the second lens group, which is the focusing lens group, is formed by a combination of a cam for focusing with a compensating cam for zooming, and a movement locus of each of the first lens group, the third lens group, and the fourth lens group, which are the movable non-focusing lens groups taking no part in focusing, is formed by a combination of the compensating cam for zooming with each cam for zooming for each lens group. As detailed in the aforementioned Japanese Patent Application No. 3-304887, the very simple arrangement of the double structure (the fixed barrel and the cam barrel) employing the cam structure can realize the manual focus of internal focusing zoom lens with second lens group which changes the feed amount for focusing. Specifically, the focus cam of the second lens group is shaped to assure a certain feed amount for focusing to a state of zooming at the same rotation angle for a specific photographic distance. Further, the compensating cam for zooming is so shaped that the combination thereof with the focus cam provides a movement locus of the second lens group upon zooming. The second lens group moves on the focus cam upon focusing, so that the second lens group moves by a desired feed amount along the optical axis to effect focusing. During zooming, the second lens group moves on the focus cam with rotation of the rotation barrel while combined with the rotational movement of the compensating cam for zoooming, so that the second lens group moves by a desired amount along the optical axis to effect zooming. Each zoom cam for movable first lens group, third lens group, or fourth lens group taking no part in focusing is so shaped that a combination thereof with the compensating cam for zooming provides a movement locus upon zooming of each lens group. During zooming, each lens group moves on each zoom cam with rotation of the rotation barrel, while combined with rotational movement of the compensating cam for zooming, so that each lens group moves by a desired amount along the optical axis to effect zooming.

DESCRIPTION OF THE PREFERRED EMBODIMENTS

Examples of the present invention will be described in detail in the following.

EXAMPLE 1

Figure 1:
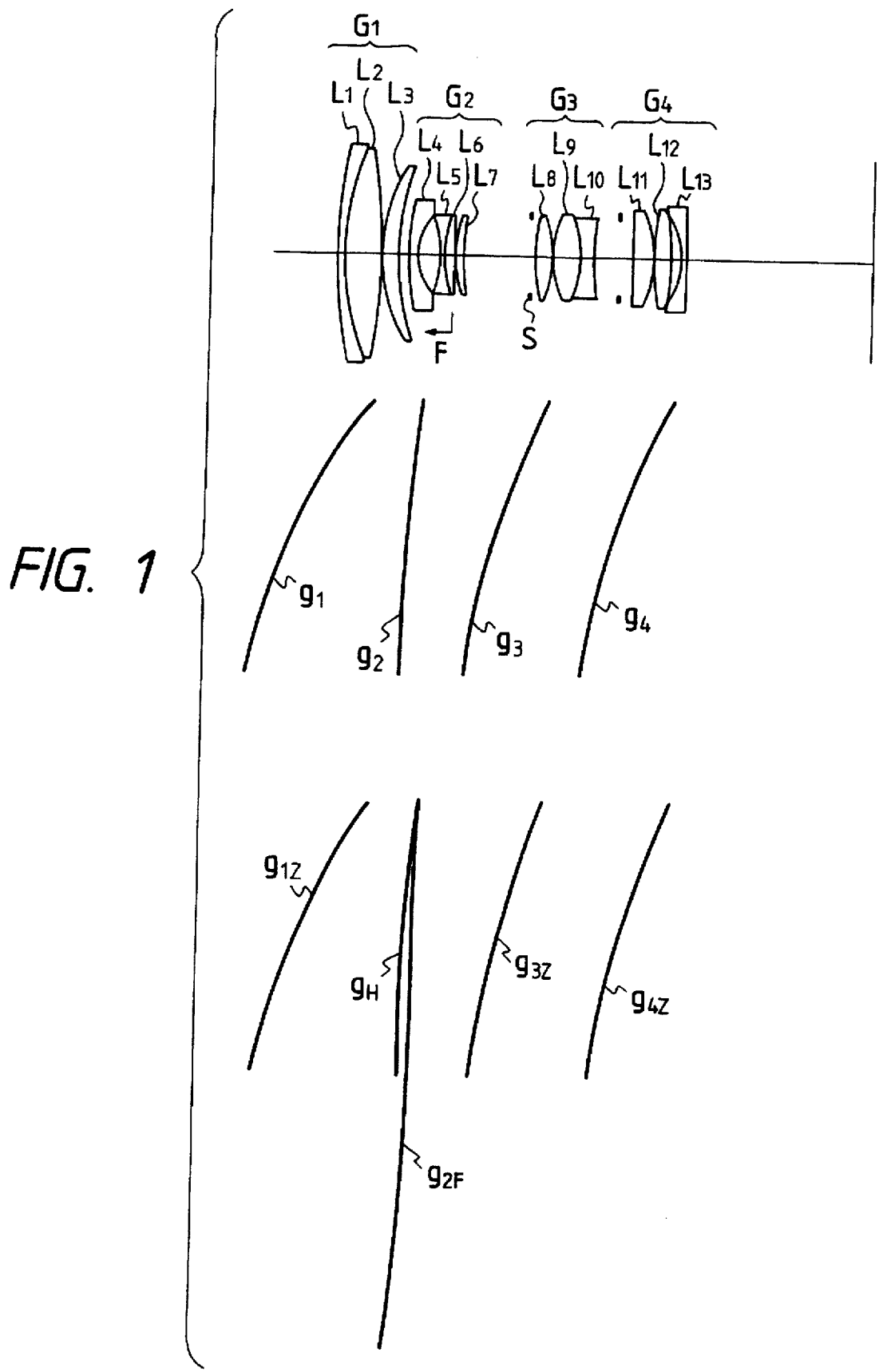
FIG. 1 is a constitutional drawing to show the lens structure of zoom lens in Example 1 according to the present invention together with drawings to show movement loci for zooming of respective lens groups and with drawings to show shapes of cam for focusing, cams for zooming and compensating cam for zooming to define zooming and focusing.

In Example 1, a zoom lens is composed in the order named from the object side, as shown in FIG. 1, of a first lens group G1 of positive refracting power, a second lens group G3 of negative refracting power, a third lens group G3 of positive refracting power, and a fourth lens group G4 of positive refracting power, in which all the lens groups move toward an object along the optical axis during zooming from wide angle to telephoto such that an air gap increases between the first lens group G1 and the second lens group G2, an air gap decreases between the second lens group G2 and the third lens group G3, and an air gap decreases between the third lens group G3 and the fourth lens group G4 and in which the second lens group G2 moves toward the object along the optical axis during focusing.

The construction of each lens group is as follows. The first lens group G1 of positive refracting power is composed of a negative meniscus lens $L_1$ with convex plane on the object side, a double convex lens $L_2$ bonded thereto, and a positive meniscus lens $L_3$ with convex plane on the object side. The second lens group G3 of negative refracting power is composed of a negative meniscus lens $L_4$ with larger curvature plane on the image side, a double concave negative lens $L_5$, a positive meniscus lens $L_6$ bonded thereto, and a positive meniscus lens $L_7$ with convex plane on the object side. The third lens group G3 of positive refracting power is composed of a double convex positive lens $L_8$, a double convex positive lens $L_9$, and a negative lens $L_{10}$ bonded thereto. The fourth lens group G4 of positive refracting power is composed of a positive lens $L_{11}$, a double convex positive lens $L_{12}$, and a negative meniscus lens $L_{13}$ with larger curvature plane on the object side.

An aperture stop S is provided on the object side of the third lens group G3 as incorporated with the third lens group G3.

Table 1 shows specifications of the zoom lens in Example 1. In the table of specifications in Example 1, f represents a focal length (mm) and FN an F-number. In Table 1, r represents a radius of curvature of each lens plane (mm), d an interplanar gap between lenses (mm), n and v an index of refraction and an Abbe's number of each lens. Accompanying numerals to the characters represent orders counted from the objective side. The middle portion of Table 1 shows values of coefficients defining the shape of an aspherical surface formed on the lens plane $r_6$ on the object side in second lens group G2.

The aspherical surface is expressed by the following aspherical equation, if a height to the optical axis is h, a distance of a vertex of aspherical surface at h to the tangent plane is x, a conical constant is k, aspherical coefficients of second order, fourth order, sixth order, eighth order and tenth order are $A_2, A_4, A_6, A_8$ and $A_{10}$, respectively, and a paraxial radius of curvature is r.

$$x = \frac{h^2/r}{1 + (1 - kh^2/r^2)^{1/2}} + \sum_{i=1}^{5} A_{2i} \cdot h^{2i}$$

In the middle portion of the specifications of lens system in Table 1, there are described in order from the left, values of the conical constant k, and the aspherical coefficients of second order, fourth order, sixth order, eighth order and tenth order, $A_2, A_4, A_6, A_8$ and $A_{10}$. $E_{-n}$ means $10^{-n}$ in the values of aspherical coefficients.

The lower portion in Table 1 shows gaps between lens groups and feed amounts for focusing for each photographic distance of infinity and 850.0 mm at three zooming positions (f=36.0, 60.0, and 103.0 mm) between wide angle end and telephoto end.

The bottom portion shows focal lengths of the lens groups, a lateral magnification of the second lens Group G2 at the wide angle end to infinity, and values corresponding to the conditions of the present invention.

The top portion of FIG. 1 is a drawing to show the lens construction of Example 1 according to the present invention, and the middle portion of FIG. 1 shows movement loci ($g_1, g_2, g_3, g_4$) of the lens groups during zooming with variable of rotation angle of the rotation barrel. Table 2 shows numerical values defining the movement loci. In Table 2, the left end column shows rotation angles θ (ANGLE) of rotation barrel, the right end column focal lengths (F), and four columns between the two end columns movement amounts of the lens groups along the optical axis.

As shown in the table, a rotation angle θ for zooming from the wide angle end to the telephoto end is set to 55° in this example.

The bottom portion of FIG. 1 shows cam shapes actually formed on the rotation barrel of zoom lens according to the present invention. In FIG. 1, $g_{2F}$ denotes the focus cam for second lens group which is the focusing lens group, $g_{1Z}, g_{3Z}$ and $g_{4Z}$ the zoom cams for first lens group, third lens group and fourth lens group, and $g_H$ the compensating zoom cam common to all the lens groups.

During actual zooming the movement locus $g_2$ of second lens group which is the focusing lens group is formed by a combination of the focus cam $g_{2F}$ with the compensating zoom cam $g_H$. Also, the moving loci $g_1, g_3$ and $g_4$ of first lens group, third lens group and fourth lens group taking no part in focusing are formed by combinations of the zoom cams $g_{1Z}, g_{3Z}$ and $g_{4Z}$ of first lens group, third lens group and fourth lens group, respectively, with the compensating zoom cam $g_H$.

Table 3 shows numerical values defining the cam locus of the focus cam $g_{2F}$. In Table 3, the left end column and the fourth column show rotation angles θ (ANGLE) of the rotation barrel, the second column and the fifth column movement amounts of the second lens group along the optical axis, and the third column and the right end column focal lengths (F). In the table, the rotation angle θ of rotation barrel of the focus cam $g_{2F}$ is set to 110°, which is a double of the rotation angle 55° for zooming. This is because the rotation angle for focusing is set to 55°, which is the same rotation angle as that for zooming. Thus, the rotation angle θ of rotation barrel of the focus cam $g_{2F}$ is 110° after the rotation angles for zooming and for focusing are combined with each other.

Figure 2:
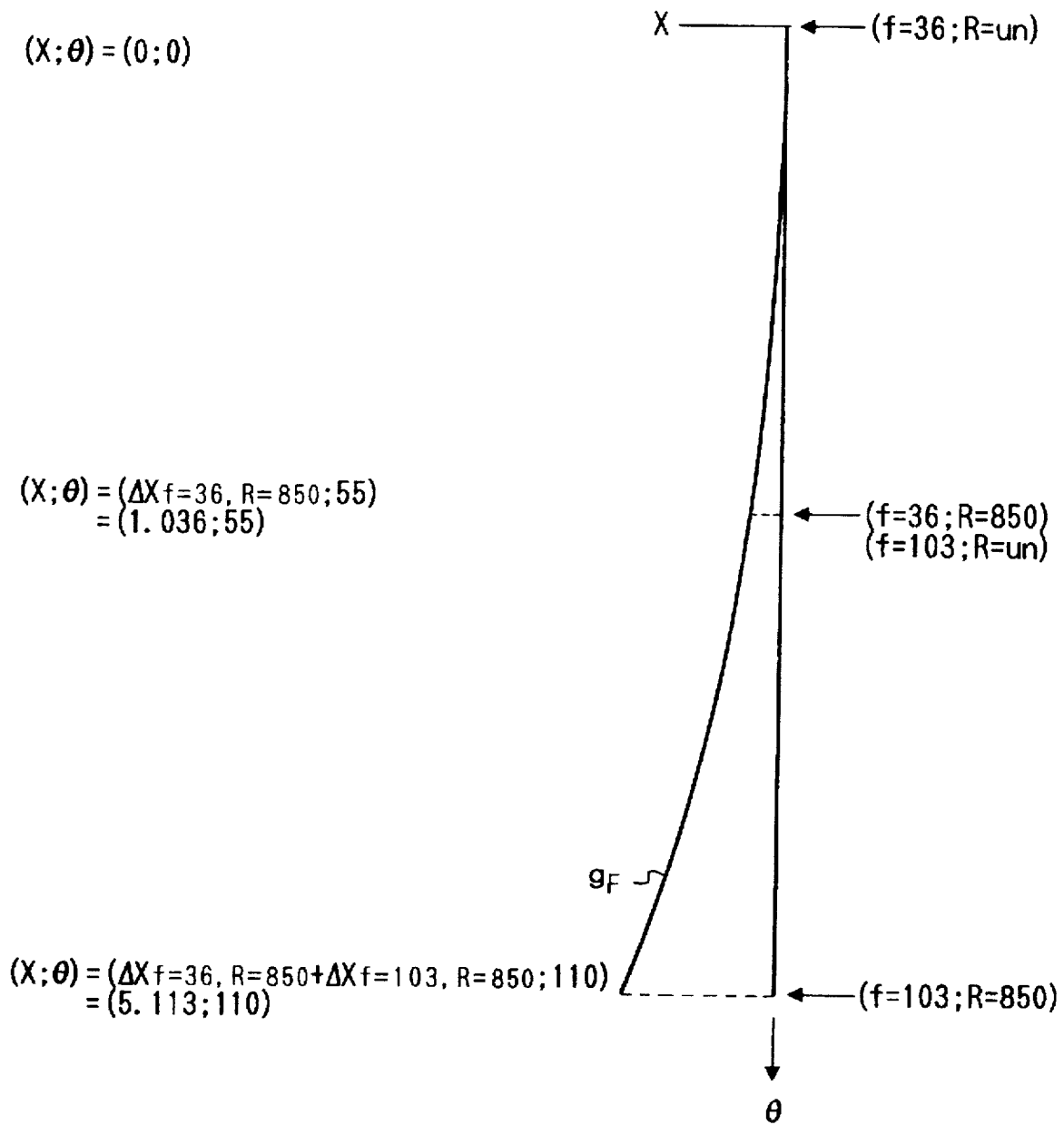
FIG. 2 is an explanatory drawing for determining a cam for focusing in the zoom lens in Example 1 according to the present invention.

Next described with FIG. 2 is how to determine the focus cam. Since the rotation angle for focusing is set to 55° which is identical to the rotation angle for zooming, the shape of focus cam $g_{2F}$ is specifically a combination of the focus cam trace defining the feed amount for focusing at wide angle end shown in Table 1 with the focus cam trace defining the feed amount for focusing at telephoto end. Suppose in FIG. 2 the feed amount for focusing is $\Delta X_{f=36, R=850}$ at wide angle end and $\Delta X_{f=103, R=850}$ at the telephoto end, respectively. If coordinates for wide angle end infinity are (X; θ)=(0; 0) and if coordinates for wide angle end photographic distance R=850.0 mm are (X; θ)=($\Delta X_{f=36, R=850}$; 55)=(1.036; 55), coordinates for telephoto end infinity are (X; θ)=(1.036; 55) and coordinates for telephoto end photographic distance R=850.0 mm are (X; θ)=($\Delta X_{f=36, R=850}+\Delta X_{f=103, R=850}$; 110) =(5.113; 110). In FIG. 2, R=un means that the photographic distance is infinity (unendlich). Further, the shape of focus cam $g_{2F}$ except for the above three points is determined as shown in Table 3 by utilizing the optimization method to obtain a feed amount for focusing necessary for arbitrary zooming state and photographic distance (for example, f=60.0 mm and R=850.0 mm).

Table 4 shows numerical values defining the cam loci of the zoom cams $g_{1Z}, g_{3Z}$ and $g_{4Z}$ of first lens group G1, third lens group G3 and fourth lens group G4. In Table 4, the left end column shows rotation angles θ (ANGLE) of the rotation barrel, the right end column focal lengths (F), and three columns between the two end columns movement amounts of the lens groups along the optical axis. The rotation angle θ for zooming from the wide angle end to the telephoto end is set to 55° identical to that in Table 2.

Table 5 shows numerical values defining the cam locus of the compensating zoom cam $g_H$ common to all the lens groups. In Table 5, the left end column shows rotation angles θ (ANGLE) of the rotation barrel, the second column movement amounts of all the lens groups along the optical axis, and the right end column focal lengths (F).

As described above, during actual zooming, the movement locus $g_2$ of the second lens group which is the focusing lens group is formed by a combination of the focus cam $g_{2F}$ with the compensating zoom cam $g_H$, and the movement loci $g_1, g_3$ and $g_4$ of first lens group, third lens group and fourth lens group taking no part in focusing are formed by combinations of the zoom cams $g_{1Z}, g_{3Z}$ and $g_{4Z}$ of first lens group, third lens group and fourth lens group, respectively, with the compensating zoom cam $g_H$. Therefore, if the movement amounts along the optical axis in Table 3 and Table 4 are added to the movement amounts along the optical axis in Table 5 in correspondence with each other, the sums should correspond to the movement amounts along the optical axis in Table 2.

Since the shape of focus cam is nonlinear to obtain a feed amount for focusing necessary for arbitrary magnification state and photographic distance, the shape of the compensating zoom cam, the shapes of the zoom cams for the respective lens groups, and the movement loci of the lens groups formed by combinations thereof all are also nonlinear as shown in FIG. 1.

Further, the barrel structure as described above can realize the manual focus of internal focusing zoom lens by the second lens group which changes the feed amount for focusing in the very simple arrangement of double structure (fixed barrel and cam barrel).

TABLE 1

| f =0 36.0–103.0  FN = 3.6–4.6 | | | | |
|---|---|---|---|---|
| r1 = 113.125 | d1 = 1.500 | n1 = 1.86074 | ν1 = 23.0 | L1 |
| r2 = 58.096 | d2 = 8.000 | n2 = 1.51860 | ν2 = 70.1 | L2 |
| r3 = −132.377 | d3 = .100 | | | |
| r4 = 33.865 | d4 = 3.800 | n3 = 1.65160 | ν3 = 58.5 | L3 |
| r5 = 57.386 | d5 = 2.285 | | | |
| r6 = 52.180 | d6 = 1.500 | n4 = 1.67025 | ν4 = 57.6 | L4 |
| r7 = 12.729 | d7 = 5.100 | | | |
| r8 = −25.386 | d8 = 1.100 | n5 = 1.74810 | ν5 = 52.3 | L5 |
| r9 = 33.461 | d9 = 2.300 | n6 = 1.86074 | ν6 = 23.0 | L6 |
| r10 = 164.298 | d10 = .100 | | | |
| r11 = 26.737 | d11 = 1.900 | n7 = 1.80458 | ν7 = 25.5 | L7 |
| r12 = 48.903 | d12 = 14.399 | | | |
| r13 = .000 | d13 = 1.000 | | | |
| r14 = 48.706 | d14 = 3.500 | n8 = 1.51860 | ν8 = 70.1 | L8 |
| r15 = −40.457 | d15 = .100 | | | |
| r16 = 20.794 | d16 = 6.200 | n9 = 1.50137 | ν9 = 56.5 | L9 |
| r17 = −21.868 | d17 = 3.000 | n10 = 1.80384 | ν10 = 33.9 | L10 |
| r18 = 64.235 | d18 = 5.600 | | | |
| r19 = .000 | d19 = 3.028 | | | |
| r20 = −2358.593 | d20 = 4.500 | n11 = 1.65844 | ν11 = 50.8 | L11 |
| r21 = =23.264 | d21 = .100 | | | |
| r22 = 78.078 | d22 = 3.300 | n12 = 1.62280 | ν12 = 57.0 | L12 |
| r23 = −53.919 | d23 = 2.400 | | | |
| r24 = −19.264 | d24 = 1.200 | n13 = 1.79631 | ν13 = 40.9 | L13 |
| r25 = −205.722 | d25 = 41.122 | | | |
| r6 = .1000E + 01 .0000 −.3439E − 05 | | −.6965E − 07 | .4212E − 09 | −.1669E − 11 |

| | pos (1) | pos (2) | pos (3) | pos (4) | pos (5) | pos (6) |
|---|---|---|---|---|---|---|
| f&b | 36.000 | 60.000 | 103.000 | −.045 | −.071 | −.106 |
| d0 | .000 | .000 | .000 | 732.865 | 720.108 | 708.079 |
| d5 | 2.285 | 13.128 | 23.354 | 1.249 | 11.258 | 19.276 |
| d12 | 14.399 | 8.209 | 2.011 | 15.435 | 10.079 | 6.088 |
| d19 | 3.028 | 1.779 | 1.119 | 3.028 | 1.779 | 1.119 |
| d25 | 41.122 | 50.475 | 59.138 | 41.122 | 50.475 | 59.138 |

| | F | (1) | (2) | (3) | (4) | R (mm) |
|---|---|---|---|---|---|---|
| 1 | 36.0000 | .0000 | 1.0357 | .0000 | .0000 | 850.00 |
| 2 | 60.0000 | .0000 | 1.8702 | .0000 | .0000 | 850.00 |
| 3 | 103.0000 | .0000 | 4.0775 | .0000 | .0000 | 850.00 |

| f1 = 71.353 | f2 = 16.808 | f3 = 37.322 | f4 = 61.710 | B = −.377 |
|---|---|---|---|---|

(1) 4.25
(2) 2.80
(3) 23.43
(4) 1.65

TABLE 2

| ANGLE | (1) | (2) | (3) | (4) | F | ANGLE | (1) | (2) | (3) | (4) | F |
|---|---|---|---|---|---|---|---|---|---|---|---|
| .0000 | .0000 | .0000 | .0000 | .0000 | 36.0000 | 21.0000 | 13.4469 | 2.0170 | 8.5173 | 9.8184 | 61.7009 |
| 1.0000 | .7295 | .1094 | .5119 | .5693 | 37.0819 | 22.0000 | 13.9278 | 2.0892 | 8.8071 | 10.1430 | 62.9232 |
| 2.0000 | 1.4523 | .2179 | 1.0118 | 1.1327 | 38.1840 | 23.0000 | 14.3928 | 2.1589 | 9.0887 | 10.4581 | 64.1364 |
| 3.0000 | 2.1684 | .3253 | 1.5001 | 1.6893 | 39.3058 | 24.0000 | 14.8439 | 2.2266 | 9.3636 | 10.7652 | 65.3446 |
| 4.0000 | 2.8775 | .4316 | 1.9771 | 2.2383 | 40.4470 | 25.0000 | 15.2830 | 2.2925 | 9.6328 | 11.0661 | 66.5518 |
| 5.0000 | 3.5795 | .5369 | 2.4430 | 2.7789 | 41.6070 | 26.0000 | 15.7116 | 2.3567 | 9.8976 | 11.3620 | 67.7617 |
| 6.0000 | 4.2742 | .6411 | 2.8980 | 3.3105 | 42.7853 | 27.0000 | 16.1313 | 2.4197 | 10.1588 | 11.6543 | 68.9781 |
| 7.0000 | 4.9613 | .7442 | 3.3426 | 3.8322 | 43.9811 | 28.0000 | 16.5434 | 2.4815 | 10.4175 | 11.9441 | 70.2048 |
| 8.0000 | 5.6407 | .8461 | 3.7769 | 4.3435 | 45.1939 | 29.0000 | 16.9490 | 2.5424 | 10.6742 | 12.2323 | 71.4449 |
| 9.0000 | 6.3121 | .9468 | 4.2012 | 4.8438 | 46.4229 | 30.0000 | 17.3475 | 2.6021 | 10.9286 | 12.5180 | 72.6952 |
| 10.0000 | 6.9756 | 1.0463 | 4.6158 | 5.3325 | 47.6674 | 31.0000 | 17.7381 | 2.6607 | 11.1799 | 12.8003 | 73.9525 |
| 11.0000 | 7.6308 | 1.1446 | 5.0211 | 5.8091 | 48.9265 | 32.0000 | 18.1202 | 2.7180 | 11.4278 | 13.0783 | 75.2136 |
| 12.0000 | 8.2776 | 1.2416 | 5.4172 | 6.2732 | 50.1995 | 33.0000 | 18.4934 | 2.7740 | 11.6716 | 13.3514 | 76.4752 |
| 13.0000 | 8.9152 | 1.3373 | 5.8043 | 6.7243 | 51.4845 | 34.0000 | 18.8572 | 2.8286 | 11.9111 | 13.6188 | 77.7345 |
| 14.0000 | 9.5410 | 1.4311 | 6.1815 | 7.1615 | 52.7770 | 35.0000 | 19.2114 | 2.8817 | 12.1460 | 13.8802 | 78.9889 |
| 15.0000 | 10.1528 | 1.5229 | 6.5484 | 7.5845 | 54.0727 | 36.0000 | 19.5562 | 2.9334 | 12.3763 | 14.1354 | 80.2373 |
| 16.0000 | 10.7486 | 1.6123 | 6.9046 | 7.9930 | 55.3675 | 37.0000 | 19.8922 | 2.9838 | 12.6022 | 14.3846 | 81.4799 |
| 17.0000 | 11.3271 | 1.6991 | 7.2499 | 8.3870 | 56.6577 | 38.0000 | 20.2197 | 3.0330 | 12.8239 | 14.6278 | 82.7171 |
| 18.0000 | 11.8872 | 1.7831 | 7.5839 | 8.7664 | 57.9397 | 39.0000 | 20.5392 | 3.0809 | 13.0417 | 14.8653 | 83.9489 |
| 19.0000 | 12.4278 | 1.8642 | 7.9067 | 9.1315 | 59.2103 | 40.0000 | 20.8512 | 3.1277 | 13.2557 | 15.0971 | 85.1755 |
| 20.0000 | 12.9477 | 1.9422 | 8.2177 | 9.4819 | 60.4646 | 41.0000 | 21.1560 | 3.1734 | 13.4663 | 15.3236 | 86.3977 |

TABLE 2-continued

| ANGLE | (1) | (2) | (3) | (4) | F |
|---|---|---|---|---|---|
| 42.0000 | 21.4543 | 3.2181 | 13.6737 | 15.5451 | 87.6166 |
| 43.0000 | 21.7462 | 3.2619 | 13.8781 | 15.7618 | 88.8323 |
| 44.0000 | 22.0319 | 3.3048 | 14.0795 | 15.9738 | 90.0442 |
| 45.0000 | 22.3114 | 3.3467 | 14.2779 | 16.1812 | 91.2522 |
| 46.0000 | 22.5849 | 3.3877 | 14.4736 | 16.3841 | 92.4560 |
| 47.0000 | 22.8527 | 3.4279 | 14.6665 | 16.5827 | 93.6556 |
| 48.0000 | 23.1147 | 3.4572 | 14.8566 | 16.7769 | 94.8505 |
| 49.0000 | 23.3711 | 3.5057 | 15.0442 | 16.9671 | 96.0408 |
| 50.0000 | 23.6222 | 3.5433 | 15.2291 | 17.1532 | 97.2261 |
| 51.0000 | 23.8679 | 3.5802 | 15.4116 | 17.3353 | 98.4063 |
| 52.0000 | 24.1080 | 3.6162 | 15.5911 | 17.5132 | 99.5788 |
| 53.0000 | 24.3416 | 3.6512 | 15.7672 | 17.6864 | 100.7386 |
| 54.0000 | 24.5679 | 3.6852 | 15.9391 | 17.8541 | 101.8806 |
| 55.0000 | 24.7863 | 3.7180 | 15.1062 | 18.0160 | 103.0000 |

TABLE 3

| ANGLE | (2) | F | ANGLE | (2) | F |
|---|---|---|---|---|---|
| .0000 | .0000 | 36.0000 |  |  |  |
| 1.0000 | .0083 | 37.0819 | 56.0000 | 1.0749 | .0000 |
| 2.0000 | .0165 | 38.1840 | 57.0000 | 1.1153 | .0000 |
| 3.0000 | .0249 | 39.3058 | 58.0000 | 1.1569 | .0000 |
| 4.0000 | .0332 | 40.4470 | 59.0000 | 1.1997 | .0000 |
| 5.0000 | .0416 | 41.6070 | 60.0000 | 1.2438 | .0000 |
| 6.0000 | .0501 | 42.7853 | 61.0000 | 1.2892 | .0000 |
| 7.0000 | .0586 | 43.9811 | 62.0000 | 1.3359 | .0000 |
| 8.0000 | .0673 | 45.1939 | 63.0000 | 1.3841 | .0000 |
| 9.0000 | .0760 | 46.4229 | 64.0000 | 1.4338 | .0000 |
| 10.0000 | .0849 | 47.6674 | 65.0000 | 1.4850 | .0000 |
| 11.0000 | .0939 | 48.9265 | 66.0000 | 1.5378 | .0000 |
| 12.0000 | .1030 | 50.1995 | 67.0000 | 1.5921 | .0000 |
| 13.0000 | .1123 | 51.4845 | 68.0000 | 1.6482 | .0000 |
| 14.0000 | .1218 | 52.7770 | 69.0000 | 1.7057 | .0000 |
| 15.0000 | .1317 | 54.0727 | 70.0000 | 1.7647 | .0000 |
| 16.0000 | .1418 | 55.3675 | 71.0000 | 1.8250 | .0000 |
| 17.0000 | .1524 | 56.6577 | 72.0000 | 1.8864 | .0000 |
| 18.0000 | .1634 | 57.9397 | 73.0000 | 1.9489 | .0000 |
| 19.0000 | .1749 | 59.2103 | 74.0000 | 2.0123 | .0000 |
| 20.0000 | .1871 | 60.4646 | 75.0000 | 2.0766 | .0000 |
| 21.0000 | .2000 | 61.7009 | 76.0000 | 2.1417 | .0000 |
| 22.0000 | .2137 | 62.9232 | 77.0000 | 2.2076 | .0000 |
| 23.0000 | .2281 | 64.1364 | 78.0000 | 2.2746 | .0000 |
| 24.0000 | .2431 | 65.3446 | 79.0000 | 2.3426 | .0000 |
| 25.0000 | .2588 | 66.5518 | 80.0000 | 2.4119 | .0000 |
| 26.0000 | .2751 | 67.7617 | 81.0000 | 2.4825 | .0000 |
| 27.0000 | .2919 | 68.9781 | 82.0000 | 2.5545 | .0000 |
| 28.0000 | .3092 | 70.2048 | 83.0000 | 2.6280 | .0000 |
| 29.0000 | .3269 | 71.4449 | 84.0000 | 2.7031 | .0000 |
| 30.0000 | .3450 | 72.6952 | 85.0000 | 2.7798 | .0000 |
| 31.0000 | .3636 | 73.9525 | 86.0000 | 2.8578 | .0000 |
| 32.0000 | .3828 | 75.2136 | 87.0000 | 2.9372 | .0000 |
| 33.0000 | .4025 | 76.4752 | 88.0000 | 3.0179 | .0000 |
| 34.0000 | .4229 | 77.7345 | 89.0000 | 3.0999 | .0000 |
| 35.0000 | .4440 | 78.9889 | 90.0000 | 3.1830 | .0000 |
| 36.0000 | .4658 | 80.2373 | 91.0000 | 3.2672 | .0000 |
| 37.0000 | .4883 | 81.4799 | 92.0000 | 3.3526 | .0000 |
| 38.0000 | .5116 | 82.7171 | 93.0000 | 3.4393 | .0000 |
| 39.0000 | .5357 | 85.9489 | 94.0000 | 3.5272 | .0000 |
| 40.0000 | .5605 | 85.1755 | 95.0000 | 3.6163 | .0000 |
| 41.0000 | .5862 | 86.3977 | 96.0000 | 3.7068 | .0000 |
| 42.0000 | .6126 | 87.6166 | 97.0000 | 3.7987 | .0000 |
| 43.0000 | .6399 | 88.8323 | 98.0000 | 3.8920 | .0000 |
| 44.0000 | .6680 | 90.0442 | 99.0000 | 3.9867 | .0000 |
| 45.0000 | .6969 | 91.2522 | 100.0000 | 4.0827 | .0000 |
| 46.0000 | .7267 | 92.4560 | 101.0000 | 4.1801 | .0000 |
| 47.0000 | .7573 | 93.6556 | 102.0000 | 4.2789 | .0000 |
| 48.0000 | .7889 | 94.8505 | 103.0000 | 4.3790 | .0000 |
| 49.0000 | .8213 | 96.0408 | 104.0000 | 4.4805 | .0000 |
| 50.0000 | .8546 | 97.2261 | 105.0000 | 4.5834 | .0000 |
| 51.0000 | .8889 | 98.4063 | 106.0000 | 4.6875 | .0000 |
| 52.0000 | .9241 | 99.5788 | 107.0000 | 4.7929 | .0000 |
| 53.0000 | .9603 | 100.7386 | 108.0000 | 4.8991 | .0000 |

TABLE 3-continued

| ANGLE | (2) | F | ANGLE | (2) | F |
|---|---|---|---|---|---|
| 54.0000 | .9974 | 101.8806 | 109.0000 | 5.0060 | .0000 |
| 55.0000 | 1.0357 | 103.0000 | 110.0000 | 5.1132 | .0000 |

TABLE 4

| ANGLE | (1) | (3) | (4) | F |
|---|---|---|---|---|
| .0000 | .0000 | .0000 | .0000 | 36.0000 |
| 1.0000 | .6283 | .4107 | .4682 | 37.0819 |
| 2.0000 | 1.2510 | .8105 | .9314 | 38.1840 |
| 3.0000 | 1.8680 | 1.1997 | 1.3889 | 39.3058 |
| 4.0000 | 2.4791 | 1.5787 | 1.8399 | 40.4470 |
| 5.0000 | 3.0842 | 1.9476 | 2.2836 | 41.6070 |
| 6.0000 | 3.6831 | 2.3070 | 2.7194 | 42.7853 |
| 7.0000 | 4.2757 | 2.6570 | 3.1467 | 43.9811 |
| 8.0000 | 4.8618 | 2.9980 | 3.5647 | 45.1939 |
| 9.0000 | 5.4413 | 3.3303 | 3.9730 | 46.4229 |
| 10.0000 | 6.0141 | 3.6543 | 4.3710 | 47.6674 |
| 11.0000 | 6.5800 | 3.9703 | 4.7583 | 48.9265 |
| 12.0000 | 7.1389 | 4.2786 | 5.1345 | 50.1995 |
| 13.0000 | 7.6902 | 4.5793 | 5.4993 | 51.4845 |
| 14.0000 | 8.2317 | 4.8722 | 5.8522 | 52.7770 |
| 15.0000 | 8.7615 | 5.1572 | 6.1933 | 54.0727 |
| 16.0000 | 9.2782 | 5.4342 | 6.5226 | 55.3675 |
| 17.0000 | 9.7804 | 5.7031 | 6.8402 | 56.6577 |
| 18.0000 | 10.2674 | 5.9642 | 7.1467 | 57.9397 |
| 19.0000 | 10.7385 | 6.2174 | 7.4422 | 59.2103 |
| 20.0000 | 11.1926 | 6.4626 | 7.7268 | 60.4646 |
| 21.0000 | 11.6299 | 6.7003 | 8.0013 | 61.7009 |
| 22.0000 | 12.0523 | 6.9316 | 8.2675 | 62.9232 |
| 23.0000 | 12.4619 | 7.1579 | 8.5272 | 64.1364 |
| 24.0000 | 12.8604 | 7.3801 | 8.7817 | 65.3446 |
| 25.0000 | 13.2493 | 7.5992 | 9.0324 | 66.5518 |
| 26.0000 | 13.6299 | 7.8159 | 9.2803 | 67.7617 |
| 27.0000 | 14.0035 | 8.0310 | 9.5265 | 68.9781 |
| 28.0000 | 14.3711 | 8.2451 | 9.7718 | 70.2048 |
| 29.0000 | 14.7336 | 8.4588 | 10.0168 | 71.4449 |
| 30.0000 | 15.0904 | 8.6715 | 10.2609 | 72.6952 |
| 31.0000 | 15.4410 | 8.8829 | 10.5032 | 73.9525 |
| 32.0000 | 15.7850 | 9.0925 | 10.7431 | 75.2136 |
| 33.0000 | 16.1219 | 9.3002 | 10.9799 | 76.4752 |
| 34.0000 | 16.4515 | 9.5055 | 11.2132 | 77.7345 |
| 35.0000 | 16.7737 | 9.7083 | 11.4425 | 78.9889 |
| 36.0000 | 17.0886 | 9.9087 | 11.6878 | 80.2373 |
| 37.0000 | 17.3967 | 10.1067 | 11.8891 | 81.4799 |
| 38.0000 | 17.6984 | 10.3026 | 12.1065 | 82.7171 |
| 39.0000 | 17.9940 | 10.4965 | 12.3201 | 83.9489 |
| 40.0000 | 18.2840 | 10.6886 | 12.5299 | 85.1755 |
| 41.0000 | 18.5688 | 10.8790 | 12.7363 | 86.3977 |
| 42.0000 | 18.8488 | 11.0681 | 12.9396 | 87.6166 |
| 43.0000 | 19.1242 | 11.2560 | 13.1397 | 88.8323 |
| 44.0000 | 19.3950 | 11.4426 | 13.3370 | 90.0442 |
| 45.0000 | 19.6616 | 11.6281 | 13.5314 | 91.2522 |
| 46.0000 | 19.9239 | 11.8125 | 13.7230 | 92.4560 |
| 47.0000 | 20.1821 | 11.9959 | 13.9121 | 93.6556 |
| 48.0000 | 20.4364 | 12.1783 | 14.0986 | 94.8505 |
| 49.0000 | 20.6868 | 12.3598 | 14.2827 | 96.0408 |
| 50.0000 | 20.9335 | 12.5405 | 14.4645 | 97.2261 |
| 51.0000 | 21.1766 | 12.7203 | 14.6440 | 98.4063 |
| 52.0000 | 21.4159 | 12.8990 | 14.8211 | 99.5788 |
| 53.0000 | 21.6506 | 13.0762 | 14.9954 | 100.7386 |
| 54.0000 | 21.8802 | 13.2514 | 15.1664 | 101.8806 |
| 55.0000 | 22.1040 | 13.4239 | 15.3337 | 103.0000 |

TABLE 5

| ANGLE | (2) | F |
|---|---|---|
| .0000 | .0000 | 36.0000 |
| 1.0000 | .1012 | 37.0819 |
| 2.0000 | .2013 | 38.1840 |
| 3.0000 | .3004 | 39.3058 |

TABLE 5-continued

| ANGLE | (2) | F |
|---|---|---|
| 4.0000 | .3984 | 40.4470 |
| 5.0000 | .4953 | 41.6070 |
| 6.0000 | .5911 | 42.7853 |
| 7.0000 | .6856 | 43.9811 |
| 8.0000 | .7788 | 45.1939 |
| 9.0000 | .8708 | 46.4229 |
| 10.0000 | .9615 | 47.6674 |
| 11.0000 | 1.0508 | 48.9265 |
| 12.0000 | 1.1386 | 50.1995 |
| 13.0000 | 1.2250 | 51.4845 |
| 14.0000 | 1.3093 | 52.7770 |
| 15.0000 | 1.3913 | 54.0727 |
| 16.0000 | 1.4705 | 55.3675 |
| 17.0000 | 1.5467 | 56.6577 |
| 18.0000 | 1.6197 | 57.9397 |
| 19.0000 | 1.6893 | 59.2103 |
| 20.0000 | 1.7551 | 60.4646 |
| 21.0000 | 1.8170 | 61.7009 |
| 22.0000 | 1.8755 | 62.9232 |
| 23.0000 | 1.9309 | 64.1364 |
| 24.0000 | 1.9835 | 65.3446 |
| 25.0000 | 2.0337 | 66.5518 |
| 26.0000 | 2.0817 | 67.7617 |
| 27.0000 | 2.1278 | 68.9781 |
| 28.0000 | 2.1723 | 70.2048 |
| 29.0000 | 2.2155 | 71.4449 |
| 30.0000 | 2.2571 | 72.6952 |
| 31.0000 | 2.2971 | 73.9525 |
| 32.0000 | 2.3352 | 75.2136 |
| 33.0000 | 2.3715 | 76.4752 |
| 34.0000 | 2.4057 | 77.7345 |
| 35.0000 | 2.4377 | 78.9889 |
| 36.0000 | 2.4676 | 80.2373 |
| 37.0000 | 2.4955 | 81.4799 |
| 38.0000 | 2.5213 | 82.7171 |
| 39.0000 | 2.5452 | 83.9489 |
| 40.0000 | 2.5672 | 85.1755 |
| 41.0000 | 2.5873 | 86.3977 |
| 42.0000 | 2.6055 | 87.6166 |
| 43.0000 | 2.6221 | 88.8323 |
| 44.0000 | 2.6368 | 90.0442 |
| 45.0000 | 2.6498 | 91.2522 |
| 46.0000 | 2.6611 | 92.4560 |
| 47.0000 | 2.6706 | 93.6556 |
| 48.0000 | 2.6783 | 94.8505 |
| 49.0000 | 2.6844 | 96.0408 |
| 50.0000 | 2.6887 | 97.2261 |
| 51.0000 | 2.6913 | 98.4063 |
| 52.0000 | 2.6921 | 99.5788 |
| 53.0000 | 2.6910 | 100.7386 |
| 54.0000 | 2.6877 | 101.8806 |
| 55.0000 | 2.6823 | 103.0000 |

EXAMPLE 2

Figure 3:
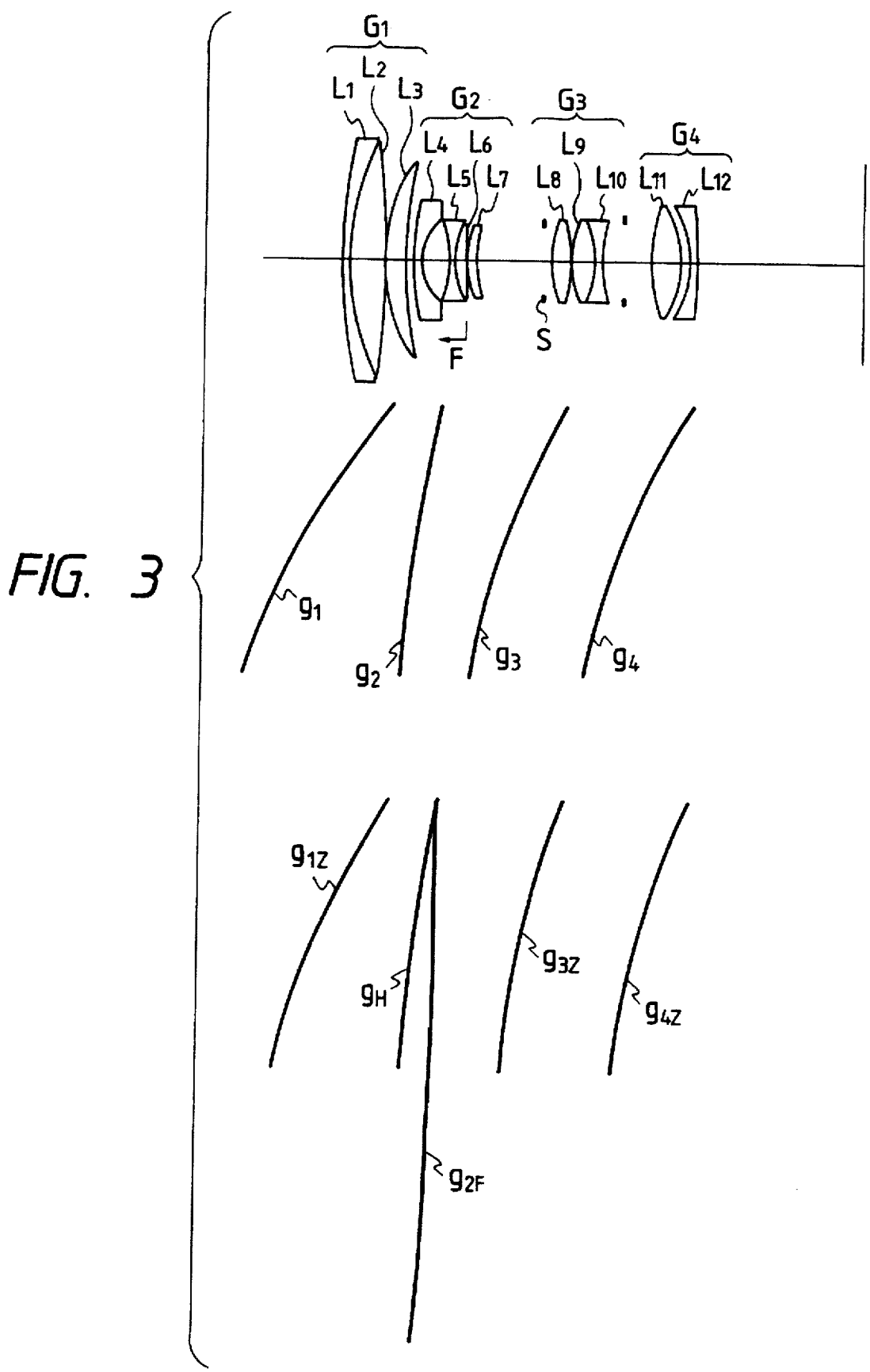
FIG. 3 is a constitutional drawing to show the lens structure of zoom lens in Example 2 according to the present invention together with drawings to show movement loci for zooming of respective lens groups and with drawings to show shapes of cam for focusing, cams for zooming and compensating cam for zooming to define zooming and focusing.

In Example 2, a zoom lens is composed in the order named from the object side, as shown in FIG. 3, of a first lens group G1 of positive refracting power, a second lens group G2 of negative refracting power, a third lens group G3 of positive refracting power, and a fourth lens group G4 of positive refracting power, in which all the lens groups move toward an object along the optical axis during zooming from wide angle to telephoto such that an air gap increases between the first lens group G1 and the second lens group G2, an air gap decreases between the second lens group G2 and the third lens group G3, and an air gap decreases between the third lens group G3 and the fourth lens group G4 and in which the second lens group G2 moves toward the object along the optical axis during focusing.

The construction of each lens group is as follows. The first lens group G1 of positive refracting power is composed of a negative meniscus lens $L_1$ with convex plane on the object side, a double convex lens $L_2$ bonded thereto, and a positive meniscus lens $L_3$ with convex plane on the object side. The second lens group G2 of negative refracting power is composed of a negative meniscus lens $L_4$ with larger curvature plane on the image side, a double concave negative lens $L_5$, a positive meniscus lens $L_6$ bonded thereto, and a positive meniscus lens $L_7$ with convex plane on the object side. The third lens group G3 of positive refracting power is composed of a double convex positive lens $L_8$, a double convex positive lens $L_9$ and a negative lens $L_{10}$ bonded thereto. The fourth lens group G4 of positive refracting power is composed of a double convex positive lens $L_{11}$ and a negative meniscus lens $L_{12}$ with larger curvature plane on the object side.

An aperture stop S is provided on the object side of the third lens group G3 as incorporated with the third lens group G3.

Table 6 shows specifications of the zoom lens in Example 2. In the table of specifications in Example 2, f represents a focal length (mm) and FN an F-number. In Table 6, r represents a radius of curvature of each lens plane (mm), d an interplanar gap between lenses (mm), n and ν an index of refraction and an Abbe's number of each lens. Accompanying numerals to the characters represent orders counted from the object side.

The middle portion of Table 6 shows values of coefficients defining the shape of an aspherical surface formed on the lens plane $r_6$ on the object side in second lens group G2 and the shape of an aspherical surface formed on the lens plane $r_{22}$ on the object side of negative lens $L_{12}$ in fourth lens group G4. In the middle portion there are described in order from the left, values of the conical constant k and the aspherical coefficients of second order, fourth order, sixth order, eighth order and tenth order, $A_2$, $A_4$, $A_6$, $A_8$ and $A_{10}$. $E_{-n}$ means $10^{-n}$ in the values of aspherical coefficients.

The lower portion in Table 6 shows gaps between lens groups and feed amounts for focusing for each photographic distance of infinity and 600.0 mm at three zooming positions (f=28.8, 50.0, and 82.5 mm) between wide angle end and telephoto end.

The bottom portion shows focal lengths of the lens groups, a lateral magnification of the second lens group G2 at the wide angle end to infinity, and values corresponding to the conditions of the present invention.

The top portion of FIG. 3 is a drawing to show the lens construction of Example 2 according to the present invention, and the middle portion of FIG. 3 shows movement loci ($g_1$, $g_2$, $g_3$, $g_4$) of the lens groups during zooming with variable of rotation angle of the rotation barrel. Table 7 shows numerical values defining the movement loci. In Table 7, the left end column shows rotation angles θ (ANGLE) of rotation barrel, the right end column focal lengths (F), and four columns between the two end columns movement amounts of the lens groups along the optical axis.

As shown in the table, a rotation angle θ for zooming from the wide angle end to the telephoto end is set to 55° in this example in the same manner as in Example 1.

The bottom portion of FIG. 3 shows cam shapes actually formed on the rotation barrel of zoom lens according to the present invention. In FIG. 3, $g_{2F}$ denotes the focus cam for second lens group which is the focusing lens group, $g_{1Z}$, $g_{3Z}$ end $g_{4Z}$ the zoom cams for first lens group, third lens group and fourth lens group, and $g_H$ the compensating zoom cam common to all the lens groups.

During actual zooming, the movement locus $g_2$ of second lens group which is the focusing lens group is formed by a combination of the focus cam $g_{2F}$ with the compensating zoom cam $g_H$. Also, the moving loci $g_1$, $g_3$ and $g_4$ of first lens group, third lens group and fourth lens group taking no part in focusing are formed by combinations of the zoom cams $g_{1Z}$, $g_{3Z}$ and $g_{4Z}$ of first lens group, third lens group and fourth lens group, respectively, with the compensating zoom cam $g_H$.

Table 8 shows numerical values defining the cam locus of the focus cam $g_{2F}$. In Table 8, the left end column and the fourth column show rotation angles θ (ANGLE) of the rotation barrel, the second column and the fifth column movement amounts of the second lens group along the optical axis, and the third column and the right end column focal lengths (F). In the table, the rotation angle θ of rotation barrel of the focus cam $g_{2F}$ is set to 110°, which is a double of the rotation angle 55° for zooming in the same manner as in Example 1.

Table 9 shows numerical values defining the cam locus of the zoom cams $g_{1Z}$, $g_{3Z}$ and $g_{4Z}$ of first lens group G1, third lens group G3 and fourth lens group G4. In Table 9, the left end column shows rotation angles θ (ANGLE) of the rotation barrel, the right end column focal lengths (F), and three columns between the two end columns movement amounts of the lens groups along the optical axis. The rotation angle θ for zooming from the wide angle end to the telephoto end is set to 55° identical to that in Table 7.

Table 10 shows numerical values defining the cam locus of the compensating zoom cam $g_H$ common to all the lens groups. In Table 10, the left end column shows rotation angles θ (ANGLE) of the rotation barrel, the second column movement amounts of all the lens groups along the optical axis, and the right end column focal lengths (F).

As described above, during actual zooming, the movement locus $g_2$ of the second lens group which is the focusing lens group is formed by a combination of the focus cam $g_{2F}$ with the compensating zoom cam $g_H$, and the movement loci $g_1$, $g_3$ and $g_4$ of first lens group, third lens group and fourth lens group taking no part in focusing are formed by combinations of the zoom cams $g_{1Z}$, $g_{3Z}$ and $g_{4Z}$ of first lens group, third lens group and fourth lens group, respectively, with the compensating zoom cam $g_H$. Therefore, if the movement amounts along the optical axis in Table 8 and Table 9 are added to the movement amounts along the optical axis in Table 10 in correspondence with each other, the sums should correspond to the movement amounts along the optical axis in Table 7.

TABLE 6 f = 28.8–82.5    FN = 3.5–4.6

| r1 = 150.000 | d1 = 1.600 | n1 = 1.86074 | v1 = 23.0 | L1 |
| r2 = 65.662 | d2 = 7.500 | n2 = 1.51680 | v2 = 64.1 | L2 |
| r3 = −215.232 | d3 = .100 | | | |
| r4 = 38.087 | d4 = 4.700 | n3 = 1.67025 | v3 = 57.6 | L3 |
| r5 = 91.398 | d5 = 1.970 | | | |
| r6 = 49.175 | d6 = 1.500 | n4 = 1.74443 | v4 = 49.5 | L4 |
| r7 = 11.831 | d7 = 6.000 | | | |
| r8 = −30.429 | d8 = 1.200 | n5 = 1.77279 | v5 = 49.4 | L5 |
| r9 = 21.445 | d9 = 2.500 | n6 = 1.86074 | v6 = 23.0 | L6 |
| r10 = 86.170 | d10 = .400 | | | |
| r11 = 26.495 | d11 = 2.300 | n7 = 1.86074 | v7 = 23.0 | L7 |
| r12 = 46.960 | d12 = 14.351 | | | |
| r13 = .000 | d13 = 1.500 | | | |
| r14 = 32.464 | d14 = 4.000 | n8 = 1.50137 | v8 = 56.5 | L8 |
| r15 = −57.234 | d15 = .100 | | | |
| r16 = 22.372 | d16 = 5.000 | n9 = 1.56384 | v9 = 60.8 | L9 |
| r17 = −24.520 | d17 = 2.000 | n10 = 1.80384 | v10 = 33.9 | L10 |
| r18 = 42.215 | d18 = 4.500 | | | |
| r19 = .000 | d19 = 6.189 | | | |
| r20 = 39.500 | d20 = 6.000 | n11 = 1.62041 | v11 = 60.3 | L11 |
| r21 = −25.592 | d21 = 2.300 | | | |
| r22 = −27.661 | d22 = 1.800 | n12 = 1.86994 | v12 = 39.8 | L12 |
| r23 = −92.686 | d23 = 43.476 | | | |

| | | | | | |
|---|---|---|---|---|---|
| r6 = .1000E + 01 | .0000 | −.3172E − 06 | −.2020E − 07 | −.9068E − 11 | −.4289E − 13 |
| r22 = .1000E + 01 | .0000 | −.2180E − 04 | −.3723E − 07 | −.1199E − 09 | .4587E − 12 |

| | pos (1) | pos (2) | pos (3) | pos (4) | pos (5) | pos (6) |
|---|---|---|---|---|---|---|
| f&b | 28.800 | 50.000 | 82.500 | −.055 | −.090 | −.135 |
| d0 | .000 | .000 | .000 | 479.014 | 463.709 | 449.283 |
| d5 | 1.970 | 13.433 | 23.791 | 1.011 | 11.831 | 20.879 |
| d12 | 14.351 | 7.912 | 3.354 | 15.310 | 9.514 | 6.265 |
| d19 | 6.189 | 4.311 | 3.311 | 6.189 | 4.311 | 3.311 |
| d23 | 43.476 | 55.635 | 65.261 | 43.476 | 55.635 | 65.261 |

| | F | (1) | (2) | (3) | (4) | R (mm) |
|---|---|---|---|---|---|---|
| 1 | 28.8000 | .0000 | .9590 | .0000 | .0000 | 600.00 |
| 2 | 50.0000 | .0000 | 1.6022 | .0000 | .0000 | 600.00 |
| 3 | 82.5000 | .0000 | 2.9112 | .0000 | .0000 | 600.00 |

| f1 = 74.000 | f2 = −14.650 | f3 = 39.000 | f4 = 51.000 | β = −.293 |
|---|---|---|---|---|

(1) 5.05
(2) 2.73
(3) 17.86
(4) 1.31

TABLE 7

| ANGLE | (1) | (2) | (3) | (4) | F |
|---|---|---|---|---|---|
| .0000 | .0000 | .0000 | .0000 | .0000 | 28.8000 |
| 1.0000 | .7181 | .1366 | .5387 | .6296 | 29.6363 |
| 2.0000 | 1.4349 | .2741 | 1.0665 | 1.2568 | 30.4908 |
| 3.0000 | 2.1510 | .4136 | 1.5845 | 1.8807 | 31.3629 |
| 4.0000 | 2.8666 | .5564 | 2.0941 | 2.5004 | 32.2517 |
| 5.0000 | 3.5824 | .7036 | 2.5968 | 3.1150 | 33.1567 |
| 6.0000 | 4.2989 | .8565 | 3.0939 | 3.7238 | 34.0767 |
| 7.0000 | 5.0167 | 1.0163 | 3.5869 | 4.3259 | 35.0109 |
| 8.0000 | 5.7361 | 1.1840 | 4.0770 | 4.9206 | 35.9578 |
| 9.0000 | 6.4551 | 1.3588 | 4.5632 | 5.5061 | 36.9150 |
| 10.0000 | 7.1708 | 1.5391 | 5.0437 | 6.0808 | 37.8795 |
| 11.0000 | 7.8809 | 1.7239 | 5.5173 | 6.6433 | 38.8487 |
| 12.0000 | 8.5833 | 1.9115 | 5.9827 | 7.1924 | 39.8200 |
| 13.0000 | 9.2767 | 2.1011 | 6.4392 | 7.7279 | 40.7924 |
| 14.0000 | 9.9609 | 2.2918 | 6.8869 | 8.2502 | 41.7660 |
| 15.0000 | 10.6354 | 2.4827 | 7.3254 | 8.7594 | 42.7406 |
| 16.0000 | 11.2997 | 2.6731 | 7.7546 | 9.2559 | 43.7160 |
| 17.0000 | 11.9536 | 2.8623 | 8.1744 | 9.7398 | 44.6922 |
| 18.0000 | 12.5965 | 3.0496 | 8.5846 | 10.2115 | 45.6691 |
| 19.0000 | 13.2283 | 3.2344 | 8.9850 | 10.6712 | 46.6467 |
| 20.0000 | 13.8488 | 3.4161 | 9.3755 | 11.1193 | 47.6251 |
| 21.0000 | 14.4576 | 3.5944 | 9.7561 | 11.5560 | 48.6042 |
| 22.0000 | 15.0545 | 3.7687 | 10.1268 | 11.9815 | 49.5840 |
| 23.0000 | 15.6397 | 3.9388 | 10.4875 | 12.3963 | 50.5648 |
| 24.0000 | 16.2141 | 4.1048 | 10.8391 | 12.8013 | 51.5479 |
| 25.0000 | 16.7789 | 4.2674 | 11.1829 | 13.1974 | 52.5350 |
| 26.0000 | 17.3343 | 4.4266 | 11.5190 | 13.5849 | 53.5257 |
| 27.0000 | 17.8804 | 4.5827 | 11.8480 | 13.9637 | 54.5195 |
| 28.0000 | 18.4171 | 4.7358 | 12.1700 | 14.3341 | 55.5158 |
| 29.0000 | 18.9445 | 4.8860 | 12.4854 | 14.6961 | 56.5143 |
| 30.0000 | 19.4628 | 5.0334 | 12.7945 | 15.0500 | 57.5143 |
| 31.0000 | 19.9720 | 5.1782 | 13.0974 | 15.3957 | 58.5155 |
| 32.0000 | 20.4722 | 5.3205 | 13.3946 | 15.7336 | 59.5176 |
| 33.0000 | 20.9636 | 5.4603 | 13.6861 | 16.0636 | 60.5199 |
| 34.0000 | 21.4463 | 5.5978 | 13.9723 | 16.3862 | 61.5226 |
| 35.0000 | 21.9202 | 5.7327 | 14.2531 | 16.7014 | 62.5251 |
| 36.0000 | 22.3854 | 5.8651 | 14.5285 | 17.0096 | 63.5275 |
| 37.0000 | 22.8417 | 5.9949 | 14.7987 | 17.3107 | 64.5295 |
| 38.0000 | 23.2893 | 6.1219 | 15.0636 | 17.6051 | 65.5308 |
| 39.0000 | 23.7284 | 6.2463 | 15.3234 | 17.8930 | 66.5317 |
| 40.0000 | 24.1588 | 6.3679 | 15.5781 | 18.1745 | 67.5316 |
| 41.0000 | 24.5809 | 6.4869 | 15.8280 | 18.4500 | 68.5311 |
| 42.0000 | 24.9949 | 6.6031 | 16.0731 | 18.7197 | 69.5304 |
| 43.0000 | 25.4013 | 6.7168 | 16.3139 | 18.9840 | 70.5303 |
| 44.0000 | 25.8005 | 6.8281 | 16.5506 | 19.2434 | 71.5316 |
| 45.0000 | 26.1937 | 6.9374 | 16.7839 | 19.4985 | 72.5364 |
| 46.0000 | 26.5815 | 7.0448 | 17.0143 | 19.7499 | 73.5463 |
| 47.0000 | 26.9639 | 7.1505 | 17.2419 | 19.9976 | 74.5611 |
| 48.0000 | 27.3402 | 7.2542 | 17.4664 | 20.2411 | 75.5780 |
| 49.0000 | 27.7092 | 7.3557 | 17.6870 | 20.4797 | 76.5938 |
| 50.0000 | 28.0702 | 7.4549 | 17.9033 | 20.7131 | 77.6055 |
| 51.0000 | 28.4223 | 7.5515 | 18.1150 | 20.9406 | 78.6100 |
| 52.0000 | 28.7650 | 7.6454 | 18.3216 | 21.1619 | 79.6046 |
| 53.0000 | 29.0975 | 7.7365 | 18.5227 | 21.3766 | 80.5862 |
| 54.0000 | 29.4194 | 7.8247 | 18.7181 | 21.5845 | 81.5523 |
| 55.0000 | 29.7302 | 7.9097 | 18.9074 | 21.7851 | 82.5002 |

TABLE 8

| ANGLE | (2) | F | ANGLE | (2) | F |
|---|---|---|---|---|---|
| .0000 | .0000 | 28.8000 | | | |
| 1.0000 | .0088 | 29.6363 | 56.0000 | .9905 | .0000 |
| 2.0000 | .0177 | 30.4908 | 57.0000 | 1.0226 | .0000 |
| 3.0000 | .0266 | 31.3629 | 58.0000 | 1.0555 | .0000 |
| 4.0000 | .0355 | 32.2517 | 59.0000 | 1.0891 | .0000 |
| 5.0000 | .0446 | 33.1567 | 60.0000 | 1.1234 | .0000 |
| 6.0000 | .0537 | 34.0767 | 61.0000 | 1.1586 | .0000 |
| 7.0000 | .0629 | 35.0109 | 62.0000 | 1.1945 | .0000 |
| 8.0000 | .0723 | 35.9578 | 63.0000 | 1.2312 | .0000 |
| 9.0000 | .0819 | 36.9150 | 64.0000 | 1.2687 | .0000 |
| 10.0000 | .0917 | 37.8795 | 65.0000 | 1.3070 | .0000 |
| 11.0000 | .1018 | 38.8487 | 66.0000 | 1.3460 | .0000 |
| 12.0000 | .1123 | 39.8200 | 67.0000 | 1.3858 | .0000 |

TABLE 8-continued

| ANGLE | (2) | F | ANGLE | (2) | F |
|---|---|---|---|---|---|
| 13.0000 | .1231 | 40.7924 | 68.0000 | 1.4263 | .0000 |
| 14.0000 | .1343 | 41.7660 | 69.0000 | 1.4676 | .0000 |
| 15.0000 | .1460 | 42.7406 | 70.0000 | 1.5097 | .0000 |
| 16.0000 | .1579 | 43.7160 | 71.0000 | 1.5525 | .0000 |
| 17.0000 | .1703 | 44.6922 | 72.0000 | 1.5961 | .0000 |
| 18.0000 | .1831 | 45.6691 | 73.0000 | 1.6405 | .0000 |
| 19.0000 | .1963 | 46.6467 | 74.0000 | 1.6857 | .0000 |
| 20.0000 | .2098 | 47.6251 | 75.0000 | 1.7318 | .0000 |
| 21.0000 | .2238 | 48.6042 | 76.0000 | 1.7786 | .0000 |
| 22.0000 | .2382 | 49.5840 | 77.0000 | 1.8262 | .0000 |
| 23.0000 | .2530 | 50.5648 | 78.0000 | 1.8747 | .0000 |
| 24.0000 | .2681 | 51.5479 | 79.0000 | 1.9239 | .0000 |
| 25.0000 | .2835 | 52.5350 | 80.0000 | 1.9740 | .0000 |
| 26.0000 | .2992 | 53.5257 | 81.0000 | 2.0248 | .0000 |
| 27.0000 | .3152 | 54.5195 | 82.0000 | 2.0765 | .0000 |
| 28.0000 | .3315 | 55.5158 | 83.0000 | 2.1290 | .0000 |
| 29.0000 | .3482 | 56.5143 | 84.0000 | 2.1823 | .0000 |
| 30.0000 | .3654 | 57.5143 | 85.0000 | 2.2365 | .0000 |
| 31.0000 | .3830 | 58.5155 | 86.0000 | 2.2915 | .0000 |
| 32.0000 | .4010 | 59.5176 | 87.0000 | 2.3474 | .0000 |
| 33.0000 | .4196 | 60.5199 | 88.0000 | 2.4043 | .0000 |
| 34.0000 | .4386 | 61.5226 | 89.0000 | 2.4620 | .0000 |
| 35.0000 | .4581 | 62.5251 | 90.0000 | 2.5205 | .0000 |
| 36.0000 | .4782 | 63.5275 | 91.0000 | 2.5800 | .0000 |
| 37.0000 | .4987 | 64.5295 | 92.0000 | 2.6403 | .0000 |
| 38.0000 | .5197 | 65.5308 | 93.0000 | 2.7014 | .0000 |
| 39.0000 | .5413 | 66.5317 | 94.0000 | 2.7633 | .0000 |
| 40.0000 | .5633 | 67.5316 | 95.0000 | 2.8260 | .0000 |
| 41.0000 | .5858 | 68.5311 | 96.0000 | 2.8896 | .0000 |
| 42.0000 | .6088 | 69.5304 | 97.0000 | 2.9540 | .0000 |
| 43.0000 | .6323 | 70.5303 | 98.0000 | 3.0192 | .0000 |
| 44.0000 | .6563 | 71.5316 | 99.0000 | 3.0854 | .0000 |
| 45.0000 | .6809 | 72.5364 | 100.0000 | 3.1526 | .0000 |
| 46.0000 | .7060 | 73.5463 | 101.0000 | 3.2208 | .0000 |
| 47.0000 | .7317 | 74.5611 | 102.0000 | 3.2902 | .0000 |
| 48.0000 | .7579 | 75.5780 | 103.0000 | 3.3605 | .0000 |
| 49.0000 | .7847 | 76.5938 | 104.0000 | 3.4317 | .0000 |
| 50.0000 | .8122 | 77.6055 | 105.0000 | 3.5037 | .0000 |
| 51.0000 | .8402 | 78.6100 | 106.0000 | 3.5763 | .0000 |
| 52.0000 | .8689 | 79.6046 | 107.0000 | 3.6493 | .0000 |
| 53.0000 | .8983 | 80.5862 | 108.0000 | 3.7227 | .0000 |
| 54.0000 | .9283 | 81.5523 | 109.0000 | 3.7964 | .0000 |
| 55.0000 | .9590 | 82.5002 | 110.0000 | 3.8702 | .0000 |

TABLE 9

| ANGLE | (1) | (3) | (4) | F |
|---|---|---|---|---|
| .0000 | .0000 | .0000 | .0000 | 28.8000 |
| 1.0000 | .5903 | .4110 | .5018 | 29.6353 |
| 2.0000 | 1.1785 | .8101 | 1.0004 | 30.4908 |
| 3.0000 | 1.7639 | 1.1975 | 1.4937 | 30.3629 |
| 4.0000 | 2.3458 | 1.5733 | 1.9795 | 32.2517 |
| 5.0000 | 2.9233 | 1.9377 | 2.4560 | 33.1567 |
| 6.0000 | 3.4960 | 2.2910 | 2.9210 | 34.0767 |
| 7.0000 | 4.0633 | 2.6335 | 3.3725 | 35.0109 |
| 8.0000 | 4.6244 | 2.9653 | 3.8089 | 35.9578 |
| 9.0000 | 5.1782 | 3.2863 | 4.2293 | 36.9150 |
| 10.0000 | 5.7233 | 3.5963 | 4.6334 | 37.8795 |
| 11.0000 | 6.2589 | 3.8953 | 5.0213 | 38.8487 |
| 12.0000 | 6.7840 | 4.1834 | 5.3932 | 39.8200 |
| 13.0000 | 7.2987 | 4.4612 | 5.7499 | 40.7924 |
| 14.0000 | 7.8035 | 4.7294 | 6.0928 | 41.7660 |
| 15.0000 | 8.2986 | 4.9887 | 6.4227 | 42.7406 |
| 16.0000 | 8.7846 | 5.2395 | 6.7407 | 43.7160 |
| 17.0000 | 9.2616 | 5.4825 | 7.0479 | 44.6922 |
| 18.0000 | 9.7301 | 5.7181 | 7.3450 | 45.6691 |
| 19.0000 | 10.1903 | 5.9469 | 7.6332 | 46.6467 |
| 20.0000 | 10.6425 | 6.1692 | 7.9130 | 47.6251 |
| 21.0000 | 11.0870 | 6.3856 | 8.1854 | 48.6042 |
| 22.0000 | 11.5241 | 6.5963 | 8.4510 | 49.5840 |
| 23.0000 | 11.9540 | 6.8017 | 8.7108 | 50.5648 |
| 24.0000 | 12.3774 | 7.0025 | 8.9646 | 51.5479 |
| 25.0000 | 12.7951 | 7.1990 | 9.2136 | 52.5350 |

TABLE 9-continued

| ANGLE | (1) | (3) | (4) | F |
|---|---|---|---|---|
| 26.0000 | 13.2069 | 7.3916 | 9.4575 | 53.5257 |
| 27.0000 | 13.6128 | 7.5805 | 9.6962 | 54.5195 |
| 28.0000 | 14.0128 | 7.7658 | 9.9298 | 55.5158 |
| 29.0000 | 14.4068 | 7.9477 | 10.1584 | 56.5143 |
| 30.0000 | 14.7947 | 8.1264 | 10.3819 | 57.5143 |
| 31.0000 | 15.1767 | 8.3022 | 10.6004 | 58.5155 |
| 32.0000 | 15.5528 | 8.4751 | 10.8141 | 59.5176 |
| 33.0000 | 15.9228 | 8.6454 | 11.0229 | 60.5199 |
| 34.0000 | 16.2871 | 8.8131 | 11.2270 | 61.5226 |
| 35.0000 | 16.6456 | 6.9785 | 11.4269 | 62.5251 |
| 36.0000 | 16.9984 | 9.1416 | 11.6226 | 63.5275 |
| 37.0000 | 17.3456 | 9.3025 | 11.8145 | 64.5295 |
| 38.0000 | 17.6871 | 9.4614 | 12.0029 | 65.5308 |
| 39.0000 | 18.0233 | 9.6183 | 12.1879 | 66.5317 |
| 40.0000 | 18.3541 | 9.7734 | 12.3698 | 67.5316 |
| 41.0000 | 18.6798 | 9.9269 | 12.5489 | 68.5311 |
| 42.0000 | 19.0005 | 10.0788 | 12.7253 | 69.5304 |
| 43.0000 | 19.3167 | 10.2293 | 12.8995 | 70.5303 |
| 44.0000 | 19.6287 | 10.3787 | 13.0716 | 71.5316 |
| 45.0000 | 19.9372 | 10.5274 | 13.2420 | 72.5364 |
| 46.0000 | 20.2427 | 10.6755 | 13.4111 | 73.5463 |
| 47.0000 | 20.5451 | 10.8231 | 13.5788 | 74.5611 |
| 48.0000 | 20.8439 | 10.9701 | 13.7448 | 75.5780 |
| 49.0000 | 21.1382 | 11.1160 | 13.9087 | 76.5938 |
| 50.0000 | 21.4274 | 11.2606 | 14.0703 | 77.6055 |
| 51.0000 | 21.7110 | 11.4037 | 14.2293 | 78.6100 |
| 52.0000 | 21.9885 | 11.5451 | 14.3854 | 79.6046 |
| 53.0000 | 22.2593 | 11.6845 | 14.5384 | 80.5862 |
| 54.0000 | 22.5231 | 11.8217 | 14.6881 | 81.5523 |
| 55.0000 | 22.7795 | 11.9567 | 14.8344 | 82.5002 |

TABLE 10

| ANGLE | (2) | F |
|---|---|---|
| .0000 | .0000 | 28.8000 |
| 1.0000 | .1278 | 29.6363 |
| 2.0000 | .2564 | 30.4908 |
| 3.0000 | .3870 | 31.3629 |
| 4.0000 | .5209 | 32.2517 |
| 5.0000 | .6591 | 33.1567 |
| 6.0000 | .8028 | 34.0767 |
| 7.0000 | .9534 | 35.0109 |
| 8.0000 | 1.1117 | 35.9578 |
| 9.0000 | 1.2769 | 36.9150 |
| 10.0000 | 1.4475 | 37.8795 |
| 11.0000 | 1.6220 | 38.8487 |
| 12.0000 | 1.7992 | 39.8200 |
| 13.0000 | 1.9780 | 40.7924 |
| 14.0000 | 2.1574 | 41.7660 |
| 15.0000 | 2.3367 | 42.7406 |
| 16.0000 | 2.5152 | 43.7160 |
| 17.0000 | 2.6920 | 44.6922 |
| 18.0000 | 2.8665 | 45.6691 |
| 19.0000 | 3.0381 | 46.6467 |
| 20.0000 | 3.2063 | 47.6251 |
| 21.0000 | 3.3706 | 48.6042 |
| 22.0000 | 3.5305 | 49.5840 |
| 23.0000 | 3.6858 | 50.5648 |
| 24.0000 | 3.8367 | 51.5479 |
| 25.0000 | 3.9838 | 52.5350 |
| 26.0000 | 4.1274 | 53.5257 |
| 27.0000 | 4.2675 | 54.5195 |
| 28.0000 | 4.4043 | 55.5158 |
| 29.0000 | 4.5378 | 56.5143 |
| 30.0000 | 4.6680 | 57.5143 |
| 31.0000 | 4.7953 | 58.5155 |
| 32.0000 | 4.9195 | 59.5176 |
| 33.0000 | 5.0408 | 60.5199 |
| 34.0000 | 5.1592 | 61.5226 |
| 35.0000 | 5.2746 | 62.5251 |
| 36.0000 | 5.3869 | 63.5275 |
| 37.0000 | 5.4962 | 64.5295 |
| 38.0000 | 5.6022 | 65.5308 |

TABLE 10-continued

| ANGLE | (2) | F |
|---|---|---|
| 39.0000 | 5.7051 | 66.5317 |
| 40.0000 | 5.8047 | 67.5316 |
| 41.0000 | 5.9011 | 68.5311 |
| 42.0000 | 5.9944 | 69.5304 |
| 43.0000 | 6.0845 | 70.5303 |
| 44.0000 | 6.1718 | 71.5316 |
| 45.0000 | 6.2565 | 72.5364 |
| 46.0000 | 6.3388 | 73.5463 |
| 47.0000 | 6.4188 | 74.5611 |
| 48.0000 | 6.4963 | 75.5780 |
| 49.0000 | 6.5710 | 76.5938 |
| 50.0000 | 6.6427 | 77.6055 |
| 51.0000 | 6.7113 | 78.6100 |
| 52.0000 | 6.7765 | 79.6046 |
| 53.0000 | 6.8382 | 80.5862 |
| 54.0000 | 6.8963 | 81.5523 |
| 55.0000 | 6.9507 | 82.5002 |

EXAMPLE 3

Figure 4:
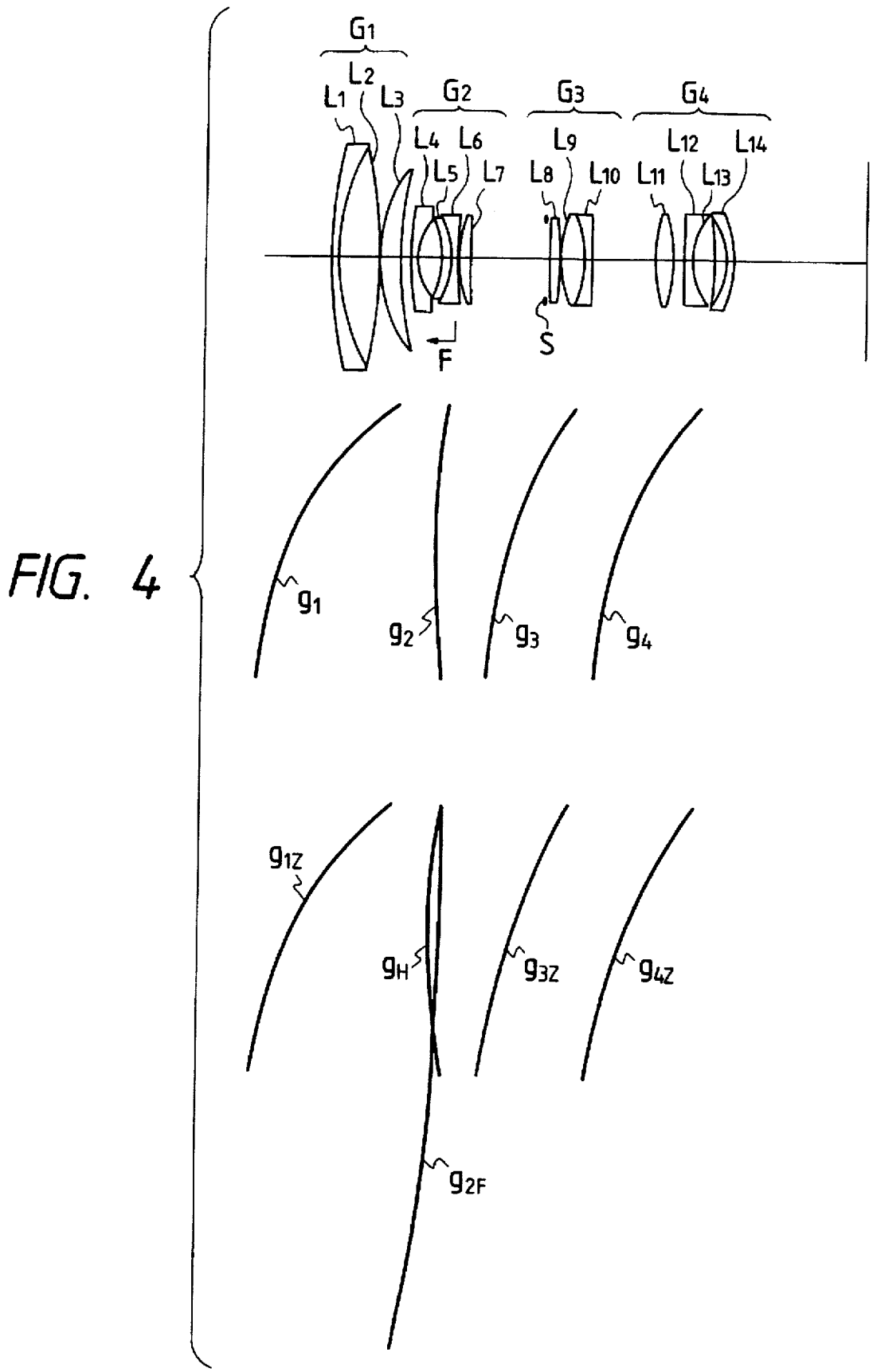
FIG. 4 is a constitutional drawing to show the lens structure of zoom lens in Example 3 according to the present invention together with drawings to show movement loci for zooming of respective lens groups and with drawings to show shapes of cam for focusing, cams for zooming and compensating cam for zooming to define zooming and focusing.

In Example 3, a zoom lens is composed in the order named from the object side, as shown in FIG. 4, of a first lens group G1 of positive refracting power, a second lens group G2 of negative refracting power, a third lens group G3 of positive refracting power, and a fourth lens group G4 of positive refracting power, in which all the lens groups move toward an object along the optical axis during zooming from wide angle to telephoto such that an air gap increases between the first lens group G1 and the second lens group G2, an air gap decreases between the second lens group G2 and the third lens group G3, and an air gap decreases between the third lens group G3 and the fourth lens group G4 and in which the second lens group G2 moves toward the object along the optical axis during focusing.

The construction of each lens group is as follows. The first lens group G1 of positive refracting power is composed of a negative meniscus lens $L_1$ with convex plane on the object side, a double convex lens $L_2$ bonded thereto, and a positive meniscus lens $L_3$ with convex plane on the object side. The second lens group G2 of negative refracting power is composed of a negative meniscus lens $L_4$ with larger curvature plane on the image side, a positive meniscus lens $L_5$ with larger curvature plane on the image side, a double concave negative lens $L_6$ bonded thereto, and a positive meniscus lens $L_7$ with convex plane on the object side. The third lens group G3 of positive refracting power is composed of a double convex positive lens $L_8$, a double convex positive lens $L_9$ and a negative lens $L_{10}$ bonded thereto. The fourth lens group G4 of positive refracting power is composed of a double convex positive lens $L_{11}$ a negative meniscus lens $L_{12}$ with larger curvature plane on the image side, a double convex positive lens $L_{13}$ bonded thereto, and a negative meniscus lens $L_{14}$ with larger curvature plane on the object side. An aperture stop S is provided on the object side of the third lens group G3 as incorporated with the third lens group G3.

Table 11 shows specifications of the zoom lens in Example 3. In the table of specifications in Example 3, f represents a focal length (mm) and FN an F-number. In Table 11, r represents a radius of curvature of each lens plane (mm), d an interplanar gap between lenses (mm), n and v an index of refraction and an Abbe's number of each lens. Accompanying numerals to the characters represent orders counted from the object side.

The middle portion of Table 11 shows values of coefficients defining the shape of an aspherical surface formed on the lens plane $r_6$ on the object side in second lens group G2. In the middle portion there are described in order from the left, values of the conical constant k and the aspherical coefficients of second order, fourth order, sixth order, eighth order and tenth order, $A_2$, $A_4$, $A_6$, $A_8$ and $A_{10}$. $E_{-n}$ means $10^{-n}$ in the values of aspherical coefficients.

The lower portion in Table 11 shows gaps between lens groups and feed amounts for focusing for each photographic distance of infinity and 800.0 mm at three zooming positions (f=36.0, 70.0, and 131.0 mm) between wide angle end and telephoto end.

The bottom portion shows focal lengths of the lens groups, a lateral magnification of the second lens group G2 at the wide angle end to infinity, and values corresponding to the conditions of the present invention.

The top portion of FIG. 4 is a drawing to show the lens construction of Example 3 according to the present invention, and the middle portion of FIG. 4 shows movement loci ($g_1$, $g_2$, $g_3$, $g_4$) of the lens groups during zooming with variable of rotation angle of the rotation barrel. Table 12 shows numerical values defining the movement loci. In Table 12, the left end column shows rotation angles $\theta$ (ANGLE) of rotation barrel, the right end column focal lengths (F), and four columns between the two end columns movement amounts of the lens groups along the optical axis.

As shown in the table, a rotation angle $\theta$ for zooming from the wide angle end to the telephoto end is set to 55° in this example in the same manner as in Example 1.

The bottom portion of FIG. 4 shows cam shapes actually formed on the rotation barrel of zoom lens according to the present invention. In FIG. 4, $g_{2F}$ denotes the focus cam for second lens group which is the focusing lens group, $g_{1Z}$, $g_{3Z}$ and $g_{4Z}$ the zoom cams for first lens group, third lens group and fourth lens group, and $g_H$ the compensating zoom cam common to all the lens groups.

During actual zooming, the movement locus $g_2$ of second lens group which is the focusing lens group is formed by a combination of the focus cam $g_{2F}$ with the compensating zoom cam $g_H$. Also, the moving loci $_1$, $g_3$ and $g_4$ of first lens group, third lens group and fourth lens group taking no part in focusing are formed by combinations of the zoom cams $g_{1Z}$, $g_{3Z}$ and $g_{4Z}$ of first lens group, third lens group and fourth lens group, respectively, with the compensating zoom cam $g_H$.

Table 13 shows numerical values defining the cam locus of the focus cam $g_{2F}$. In Table 13, the left end column and the fourth column show rotation angles $\theta$ (ANGLE) of the rotation barrel, the second column and the fifth column movement amounts of the second lens group along the optical axis, and the third column and the right end column focal lengths (F). In the table, the rotation angle $\theta$ of rotation barrel of the focus cam $g_{2F}$ is set to 110°, which is a double of the rotation angle 55° for zooming in the same manner as in Example 1.

Table 14 shows numerical values defining the cam locus of the zoom cams $g_{1Z}$, $g_{3Z}$ and $g_{4Z}$ of first lens group G1, third lens group G3 and fourth lens group G4. In Table 14, the left end column shows rotation angles $\theta$ (ANGLE) of rotation barrel, the right end column focal lengths (F), and three columns between the two end columns movement amounts of the lens groups along the optical axis. The rotation angle $\theta$ for zooming from the wide angle end to the telephoto end is set to 55° identical to that in Table 12.

Table 15 shows numerical values defining the cam locus of the compensating zoom cam $g_H$ common to all the lens groups. In Table 15, the left end column shows rotation angles $\theta$ (ANGLE) of the rotation barrel, the second column movement amounts of all the lens groups along the optical axis, and the right end column focal lengths (F).

As described above, during actual zooming, the movement locus $g_2$ of the second lens group which is the focusing lens group is formed by a combination of the focus cam $g_{2F}$ with the compensating zoom cam $g_H$, and the movement loci $g_1$, $g_3$ and $g_4$ of first lens group, third lens group and fourth lens group taking no part in focusing are formed by combinations of the zoom cams $g_{1Z}$, $g_{3Z}$ and $g_{4Z}$ of first lens group, third lens group and fourth lens group, respectively, with the compensating zoom cam $g_H$. Therefore, if the movement amounts along the optical axis in Table 13 and Table 14 are added to the movement amounts along the optical axis in Table 15 in correspondence with each other, the sums should correspond to the movement amounts along the optical axis in Table 12.

TABLE 11

| f = 36.0–131.0 FN = 3.6–4.6 | | | | |
|---|---|---|---|---|
| r1 = 130.884 | d1 = 1.400 | n1 = 1.80518 | v1 = 25.4 | L1 |
| r2 = 58.027 | d2 = 9.700 | n2 = 1.51860 | v2 = 70.1 | L2 |
| r3 = −157.126 | d3 = .100 | | | |
| r4 = 39.031 | d4 = 5.500 | n3 = 1.61720 | v3 = 54.0 | L3 |
| r5 = 91.293 | d5 = 2.639 | | | |
| r6 = 72.574 | d6 = 1.500 | n4 = 1.77279 | v4 = 49.4 | L4 |
| r7 = 14.850 | d7 = 5.500 | | | |
| r8 = −25.147 | d8 = 2.700 | n5 = 1.80518 | v5 = 25.4 | L5 |
| r9 = −18.882 | d9 = 1.200 | n6 = 1.74810 | v6 = 52.3 | L6 |
| r10 = 70.764 | d10 = .500 | | | |
| r11 = 38.956 | d11 = 2.500 | n7 = 1.86074 | v7 = 23.0 | L7 |
| r12 = 731.283 | d12 = 18.243 | | | |
| r13 = .000 | d13 = 1.300 | | | |
| r14 = 158.779 | d14 = 2.500 | n8 = 1.61272 | v8 = 58.6 | L8 |
| r15 = −66.107 | d15 = .100 | | | |
| r16 = 26.962 | d16 = 6.000 | n9 = 1.51680 | v9 = 64.1 | L9 |
| r17 = −25.683 | d17 = 1.500 | n10 = 1.80384 | v10 = 33.9 | L10 |
| r18 = −11035.229 | d18 = 14.933 | | | |
| r19 = 36.870 | d19 = 4.500 | n11 = 1.51860 | v11 = 70.1 | L11 |
| r20 = −39.884 | d20 = 3.000 | | | |
| r21 = 233.745 | d21 = 1.500 | n12 = 1.79668 | v12 = 45.4 | L12 |
| r22 = 17.542 | d22 = 6.000 | n13 = 1.61266 | v13 = 44.4 | L13 |
| r23 = −72.148 | d23 = 3.000 | | | |

TABLE 11-continued f = 36.0–131.0  FN = 3.6–4.6

| r24 = −17.423 | d24 = 1.500 | n14 = 1.80384 | v14 = 33.9 | L14 |
| r25 = −32.268 | d25 = 42.711 | | | | r6 = .1000E + 01   .0000   −.2147E − 05   −.2368E − 07   .1275E − 09   −.4418E − 12

| | pos (1) | pos (2) | pos (3) | pos (4) | pos (5) | pos (6) |
|---|---|---|---|---|---|---|
| f&b | 36.000 | 70.000 | 131.001 | −.050 | −.088 | −.124 |
| d0 | .000 | .000 | .000 | 659.974 | 643.460 | 633.061 |
| d5 | 2.639 | 17.599 | 29.195 | 1.554 | 15.088 | 22.327 |
| d12 | 18.243 | 10.076 | 2.206 | 19.327 | 12.587 | 9.074 |
| d18 | 14.932 | 12.214 | 11.088 | 14.932 | 12.214 | 11.088 |
| d25 | 42.712 | 55.151 | 62.950 | 42.712 | 55.151 | 62.950 |

| | F | (1) | (2) | (3) | (4) | R (mm) |
|---|---|---|---|---|---|---|
| 1 | 36.0000 | .0000 | 1.0847 | .0000 | .0000 | 800.00 |
| 2 | 70.0000 | .0000 | 2.5108 | .0000 | .0000 | 800.00 |
| 3 | 131.0000 | .0000 | 6.8683 | .0000 | .0000 | 800.00 | f1 = 71.987   f2 = −16.498   f3 = 44.471   f4 = 80.047   β = −.367

(1) 4.36
(2) 2.75
(3) 22.41
(4) 1.80

TABLE 12

| ANGLE | (1) | (2) | (3) | (4) | F |
|---|---|---|---|---|---|
| .0000 | .0000 | .0000 | .0000 | .0000 | 35.9993 |
| 1.0000 | 1.1617 | .1179 | .7074 | .8493 | 37.5924 |
| 2.0000 | 2.3159 | .2349 | 1.4008 | 1.6943 | 39.2535 |
| 3.0000 | 3.4540 | .3498 | 2.0768 | 2.5297 | 40.9754 |
| 4.0000 | 4.5695 | .4620 | 2.7337 | 3.3517 | 42.7517 |
| 5.0000 | 5.6573 | .5706 | 3.3703 | 4.1574 | 44.5764 |
| 6.0000 | 6.7139 | .6754 | 3.9860 | 4.9447 | 46.4440 |
| 7.0000 | 7.7367 | .7759 | 4.5807 | 5.7121 | 48.3493 |
| 8.0000 | 8.7241 | .8720 | 5.1546 | 6.4585 | 50.2874 |
| 9.0000 | 9.6750 | .9634 | 5.7079 | 7.1829 | 52.2536 |
| 10.0000 | 10.5890 | 1.0500 | 6.2403 | 7.8832 | 54.2417 |
| 11.0000 | 11.4659 | 1.1314 | 6.7516 | 8.5577 | 56.2460 |
| 12.0000 | 12.3060 | 1.2077 | 7.2421 | 9.2053 | 58.2612 |
| 13.0000 | 13.1101 | 1.2789 | 7.7124 | 9.8256 | 60.2827 |
| 14.0000 | 13.8790 | 1.3451 | 8.1632 | 10.4186 | 62.3065 |
| 15.0000 | 14.6139 | 1.4064 | 8.5953 | 10.9843 | 64.3288 |
| 16.0000 | 15.3159 | 1.4630 | 9.0094 | 11.5234 | 66.3462 |
| 17.0000 | 15.9884 | 1.5151 | 9.4066 | 12.0365 | 68.3562 |
| 18.0000 | 16.6266 | 1.5629 | 9.7877 | 12.5243 | 70.3557 |
| 19.0000 | 17.2384 | 1.6074 | 10.1544 | 12.9885 | 72.3438 |
| 20.0000 | 17.8250 | 1.6505 | 10.5098 | 13.4318 | 74.3206 |
| 21.0000 | 18.3890 | 1.6939 | 10.8567 | 13.8567 | 76.2867 |
| 22.0000 | 18.9331 | 1.7391 | 11.1974 | 14.2654 | 78.2425 |
| 23.0000 | 19.4592 | 1.7872 | 11.5337 | 14.6598 | 80.1883 |
| 24.0000 | 19.9693 | 1.8392 | 11.8670 | 15.0414 | 82.1241 |
| 25.0000 | 20.4651 | 1.8957 | 12.1988 | 15.4118 | 84.0499 |
| 26.0000 | 20.9480 | 1.9573 | 12.5297 | 15.7722 | 85.9662 |
| 27.0000 | 21.4138 | 2.0188 | 12.8541 | 16.1197 | 87.8672 |
| 28.0000 | 21.8544 | 2.0710 | 13.1614 | 16.4482 | 89.7427 |
| 29.0000 | 22.2646 | 2.1079 | 13.4445 | 16.7541 | 91.5851 |
| 30.0000 | 22.6424 | 2.1266 | 13.7004 | 17.0358 | 93.3903 |
| 31.0000 | 22.9882 | 2.1267 | 13.9292 | 17.2938 | 95.1567 |
| 32.0000 | 23.3038 | 2.1097 | 14.1327 | 17.5294 | 96.8851 |
| 33.0000 | 23.5923 | 2.0773 | 14.3137 | 17.7449 | 98.5783 |
| 34.0000 | 23.8566 | 2.0318 | 14.4751 | 17.9425 | 100.2404 |
| 35.0000 | 24.0997 | 1.9752 | 14.6199 | 18.1243 | 101.8751 |
| 36.0000 | 24.3241 | 1.9092 | 14.7506 | 18.2923 | 103.4861 |
| 37.0000 | 24.5321 | 1.8354 | 14.8693 | 18.4481 | 105.0768 |
| 38.0000 | 24.7258 | 1.7554 | 14.9784 | 18.5934 | 106.6503 |
| 39.0000 | 24.9075 | 1.6710 | 15.0800 | 18.7297 | 108.2088 |
| 40.0000 | 25.0788 | 1.5840 | 15.1759 | 18.8583 | 109.7520 |
| 41.0000 | 25.2408 | 1.4954 | 15.2675 | 18.9600 | 111.2791 |
| 42.0000 | 25.3945 | 1.4062 | 15.3555 | 19.0955 | 112.7895 |
| 43.0000 | 25.5409 | 1.3173 | 15.4411 | 19.2055 | 114.2819 |
| 44.0000 | 25.6805 | 1.2290 | 15.5245 | 19.3104 | 115.7568 |
| 45.0000 | 25.8141 | 1.1417 | 15.6063 | 19.4109 | 117.2156 |
| 46.0000 | 25.9423 | 1.0556 | 15.6870 | 19.5074 | 118.6598 |
| 47.0000 | 26.0858 | .9708 | 15.7669 | 19.6003 | 120.0904 |
| 48.0000 | 26.1848 | .8875 | 15.8463 | 19.6899 | 121.5086 |
| 49.0000 | 26.3000 | .8057 | 15.9255 | 19.7766 | 122.9155 |
| 50.0000 | 26.4116 | .7254 | 16.0046 | 19.8606 | 124.3123 |
| 51.0000 | 26.5199 | .6469 | 16.0838 | 19.9421 | 125.6989 |
| 52.0000 | 26.6245 | .5703 | 16.1629 | 20.0209 | 127.0695 |
| 53.0000 | 26.7254 | .4963 | 16.2412 | 20.0968 | 128.4155 |
| 54.0000 | 26.8218 | .4252 | 16.3185 | 20.1694 | 129.7284 |
| 55.0000 | 26.9135 | .3575 | 16.3942 | 20.2384 | 130.9999 |

TABLE 13

| ANGLE | (2) | F | ANGLE | (2) | F |
|---|---|---|---|---|---|
| .0000 | .0000 | 35.9993 | | | |
| 1.0000 | .0034 | 37.5924 | 56.0000 | 1.1422 | .0000 |
| 2.0000 | .0069 | 39.2535 | 57.0000 | 1.2034 | .0000 |
| 3.0000 | .0104 | 40.9754 | 58.0000 | 1.2682 | .0000 |
| 4.0000 | .0141 | 42.7517 | 59.0000 | 1.3367 | .0000 |
| 5.0000 | .0178 | 44.5764 | 60.0000 | 1.4086 | .0000 |
| 6.0000 | .0218 | 46.4440 | 61.0000 | 1.4839 | .0000 |
| 7.0000 | .0259 | 48.3493 | 62.0000 | 1.5625 | .0000 |
| 8.0000 | .0303 | 50.2874 | 63.0000 | 1.6444 | .0000 |
| 9.0000 | .0349 | 52.2536 | 64.0000 | 1.7294 | .0000 |
| 10.0000 | .0398 | 54.2417 | 65.0000 | 1.8175 | .0000 |
| 11.0000 | .0451 | 56.2460 | 66.0000 | 1.9086 | .0000 |
| 12.0000 | .0507 | 58.2612 | 67.0000 | 2.0026 | .0000 |
| 13.0000 | .0567 | 60.2827 | 68.0000 | 2.0994 | .0000 |
| 14.0000 | .0632 | 62.3065 | 69.0000 | 2.1989 | .0000 |
| 15.0000 | .0701 | 64.3288 | 70.0000 | 2.3011 | .0000 |
| 16.0000 | .0775 | 66.3462 | 71.0000 | 2.4059 | .0000 |
| 17.0000 | .0854 | 68.3562 | 72.0000 | 2.5132 | .0000 |
| 18.0000 | .0939 | 70.3557 | 73.0000 | 2.6229 | .0000 |
| 19.0000 | .1030 | 72.3438 | 74.0000 | 2.7349 | .0000 |
| 20.0000 | .1127 | 74.3206 | 75.0000 | 2.8492 | .0000 |
| 21.0000 | .1231 | 76.2867 | 76.0000 | 2.9656 | .0000 |
| 22.0000 | .1342 | 78.2425 | 77.0000 | 3.0841 | .0000 |

TABLE 13-continued

| ANGLE | (2) | F | ANGLE | (2) | F |
|---|---|---|---|---|---|
| 23.0000 | .1460 | 80.1883 | 78.0000 | 3.2046 | .0000 |
| 24.0000 | .1585 | 82.1241 | 79.0000 | 3.3270 | .0000 |
| 25.0000 | .1719 | 84.0499 | 80.0000 | 3.4512 | .0000 |
| 26.0000 | .1861 | 85.9662 | 81.0000 | 3.5772 | .0000 |
| 27.0000 | .2011 | 87.8672 | 82.0000 | 3.7049 | .0000 |
| 28.0000 | .2169 | 89.7427 | 83.0000 | 3.8342 | .0000 |
| 29.0000 | .2335 | 91.5851 | 84.0000 | 3.9650 | .0000 |
| 30.0000 | .2510 | 93.3903 | 85.0000 | 4.0973 | .0000 |
| 31.0000 | .2693 | 95.1567 | 86.0000 | 4.2309 | .0000 |
| 32.0000 | .2885 | 96.8851 | 87.0000 | 4.3660 | .0000 |
| 33.0000 | .3087 | 98.5783 | 88.0000 | 4.5024 | .0000 |
| 34.0000 | .3297 | 100.2404 | 89.0000 | 4.6404 | .0000 |
| 35.0000 | .3519 | 101.8751 | 90.0000 | 4.7802 | .0000 |
| 36.0000 | .3751 | 103.4861 | 91.0000 | 4.9218 | .0000 |
| 37.0000 | .3995 | 105.0768 | 92.0000 | 5.0654 | .0000 |
| 38.0000 | .4251 | 106.6503 | 93.0000 | 5.2113 | .0000 |
| 39.0000 | .4520 | 108.2088 | 94.0000 | 5.3594 | .0000 |
| 40.0000 | .4802 | 109.7520 | 95.0000 | 5.5095 | .0000 |
| 41.0000 | .5099 | 111.2791 | 96.0000 | 5.6616 | .0000 |
| 42.0000 | .5410 | 112.7893 | 97.0000 | 5.8155 | .0000 |
| 43.0000 | .5737 | 114.2819 | 98.0000 | 5.9710 | .0000 |
| 44.0000 | .6079 | 115.7568 | 99.0000 | 6.1282 | .0000 |
| 45.0000 | .6436 | 117.2156 | 100.0000 | 6.2869 | .0000 |
| 46.0000 | .6808 | 118.6598 | 101.0000 | 6.4472 | .0000 |
| 47.0000 | .7194 | 120.0904 | 102.0000 | 6.6090 | .0000 |
| 48.0000 | .7593 | 121.5086 | 103.0000 | 6.7724 | .0000 |
| 49.0000 | .8006 | 122.9155 | 104.0000 | 6.9373 | .0000 |
| 50.0000 | .8433 | 124.3123 | 105.0000 | 7.1038 | .0000 |
| 51.0000 | .8871 | 125.6989 | 106.0000 | 7.2717 | .0000 |
| 52.0000 | .9327 | 127.0695 | 107.0000 | 7.4409 | .0000 |
| 53.0000 | .9805 | 128.4155 | 108.0000 | 7.6110 | .0000 |
| 54.0000 | 1.0309 | 129.7284 | 109.0000 | 7.7818 | .0000 |
| 55.0000 | 1.0847 | 130.9999 | 110.0000 | 7.9529 | .0000 |

TABLE 14

| ANGLE | (1) | (3) | (4) | F |
|---|---|---|---|---|
| .0000 | .0000 | .0000 | .0000 | 35.9993 |
| 1.0000 | 1.0472 | .5929 | .7348 | 37.5924 |
| 2.0000 | 2.0880 | 1.1728 | 1.4663 | 39.2535 |
| 3.0000 | 3.1146 | 1.7374 | 2.1903 | 40.9754 |
| 4.0000 | 4.1216 | 2.2858 | 2.9038 | 42.7517 |
| 5.0000 | 5.1045 | 2.8175 | 3.6046 | 44.5764 |
| 6.0000 | 6.0603 | 3.3324 | 4.2910 | 46.4440 |
| 7.0000 | 6.9868 | 3.8307 | 4.9621 | 48.3493 |
| 8.0000 | 7.8824 | 4.3129 | 5.6168 | 50.2874 |
| 9.0000 | 8.7465 | 4.7794 | 6.2544 | 52.2536 |
| 10.0000 | 9.5788 | 5.2301 | 6.8730 | 54.2417 |
| 11.0000 | 10.3795 | 5.6652 | 7.4713 | 56.2460 |
| 12.0000 | 11.1490 | 6.0851 | 8.0483 | 58.2612 |
| 13.0000 | 11.8879 | 6.4902 | 8.6034 | 60.2827 |
| 14.0000 | 12.5971 | 6.8813 | 9.1367 | 62.3065 |
| 15.0000 | 13.2776 | 7.2590 | 9.6480 | 64.3288 |
| 16.0000 | 13.9305 | 7.6239 | 10.1379 | 66.3462 |
| 17.0000 | 14.5568 | 7.9769 | 10.6068 | 68.5562 |
| 18.0000 | 15.1575 | 8.3187 | 11.0553 | 70.3557 |
| 19.0000 | 15.7340 | 8.6500 | 11.4841 | 72.3438 |
| 20.0000 | 16.2872 | 8.9721 | 11.8941 | 74.3206 |
| 21.0000 | 16.8182 | 9.2859 | 12.2859 | 76.2867 |
| 22.0000 | 17.3281 | 9.5925 | 12.6605 | 78.2425 |
| 23.0000 | 17.8180 | 9.8925 | 13.0185 | 80.1883 |
| 24.0000 | 18.2887 | 10.1864 | 13.3608 | 82.1241 |
| 25.0000 | 18.7413 | 10.4749 | 13.6880 | 84.0499 |
| 26.0000 | 19.1767 | 10.7585 | 14.0010 | 85.9662 |
| 27.0000 | 19.5960 | 11.0364 | 14.3019 | 87.8672 |
| 28.0000 | 20.0003 | 11.3072 | 14.5941 | 89.7427 |
| 29.0000 | 20.3903 | 11.5701 | 14.8797 | 91.5851 |
| 30.0000 | 20.7669 | 11.8249 | 15.1603 | 93.3903 |
| 31.0000 | 21.1308 | 12.0718 | 15.4364 | 95.1567 |
| 32.0000 | 21.4827 | 12.3116 | 15.7083 | 96.8851 |
| 33.0000 | 21.8236 | 12.5450 | 15.9762 | 98.5783 |
| 34.0000 | 22.1545 | 12.7730 | 16.2404 | 100.2404 |
| 35.0000 | 22.4764 | 12.9966 | 16.5010 | 101.8751 |

TABLE 14-continued

| ANGLE | (1) | (3) | (4) | F |
|---|---|---|---|---|
| 36.0000 | 22.7900 | 13.2164 | 16.7582 | 103.4861 |
| 37.0000 | 23.0961 | 13.4334 | 17.0122 | 105.0768 |
| 38.0000 | 23.3955 | 13.6480 | 17.2631 | 106.6503 |
| 39.0000 | 23.6885 | 13.8609 | 17.5107 | 108.2088 |
| 40.0000 | 23.9751 | 14.0722 | 17.7546 | 109.7520 |
| 41.0000 | 24.2554 | 14.2820 | 17.9945 | 111.2791 |
| 42.0000 | 24.5294 | 14.4904 | 18.2303 | 112.7893 |
| 43.0000 | 24.7973 | 14.6975 | 18.4619 | 114.2819 |
| 44.0000 | 25.0594 | 14.9034 | 18.6893 | 115.7568 |
| 45.0000 | 25.3160 | 15.1082 | 18.9128 | 117.2156 |
| 46.0000 | 25.5575 | 15.3122 | 19.1326 | 118.6598 |
| 47.0000 | 25.8143 | 15.5155 | 19.3488 | 120.0904 |
| 48.0000 | 26.0567 | 15.7182 | 19.5618 | 121.5086 |
| 49.0000 | 26.2950 | 15.9205 | 19.7715 | 122.9155 |
| 50.0000 | 26.5294 | 16.1225 | 19.9784 | 124.3123 |
| 51.0000 | 26.7602 | 16.3241 | 20.1824 | 125.6989 |
| 52.0000 | 26.9870 | 16.5253 | 20.3833 | 127.0695 |
| 53.0000 | 27.2096 | 16.7254 | 20.5810 | 128.4155 |
| 54.0000 | 27.4275 | 16.9243 | 20.7751 | 129.7284 |
| 55.0000 | 27.6407 | 17.1214 | 20.9656 | 130.9999 |

TABLE 15

| ANGLE | (2) | F |
|---|---|---|
| .0000 | .0000 | 35.9993 |
| 1.0000 | .1145 | 37.5924 |
| 2.0000 | .2280 | 39.2535 |
| 3.0000 | .3394 | 40.9754 |
| 4.0000 | .4479 | 42.7517 |
| 5.0000 | .5528 | 44.5764 |
| 6.0000 | .6536 | 46.4440 |
| 7.0000 | .7500 | 48.3493 |
| 8.0000 | .8417 | 50.2874 |
| 9.0000 | .9285 | 52.2536 |
| 10.0000 | 1.0101 | 54.2417 |
| 11.0000 | 1.0863 | 56.2460 |
| 12.0000 | 1.1570 | 58.2612 |
| 13.0000 | 1.2222 | 60.2827 |
| 14.0000 | 1.2819 | 62.3065 |
| 15.0000 | 1.3363 | 64.3288 |
| 16.0000 | 1.3855 | 66.3462 |
| 17.0000 | 1.4297 | 68.3562 |
| 18.0000 | 1.4690 | 70.3557 |
| 19.0000 | 1.5044 | 72.3438 |
| 20.0000 | 1.5377 | 74.3206 |
| 21.0000 | 1.5708 | 76.2867 |
| 22.0000 | 1.6049 | 78.2425 |
| 23.0000 | 1.6412 | 80.1883 |
| 24.0000 | 1.6806 | 82.1241 |
| 25.0000 | 1.7238 | 84.0499 |
| 26.0000 | 1.7713 | 85.9662 |
| 27.0000 | 1.8177 | 87.8672 |
| 28.0000 | 1.8542 | 89.7427 |
| 29.0000 | 1.8744 | 91.5851 |
| 30.0000 | 1.8756 | 93.3903 |
| 31.0000 | 1.8574 | 95.1567 |
| 32.0000 | 1.8211 | 96.8851 |
| 33.0000 | 1.7687 | 98.5783 |
| 34.0000 | 1.7021 | 100.2404 |
| 35.0000 | 1.6233 | 101.8751 |
| 36.0000 | 1.5341 | 103.4861 |
| 37.0000 | 1.4360 | 105.0768 |
| 38.0000 | 1.3303 | 106.6503 |
| 39.0000 | 1.2191 | 108.2088 |
| 40.0000 | 1.1037 | 109.7520 |
| 41.0000 | .9855 | 111.2791 |
| 42.000 | .8652 | 112.7893 |
| 43.0000 | .7436 | 114.2819 |
| 44.0000 | .6211 | 115.7568 |
| 45.0000 | .4981 | 117.2156 |
| 46.0000 | .3748 | 118.6598 |
| 47.0000 | .2514 | 120.0904 |
| 48.0000 | .1281 | 121.5086 |

TABLE 15-continued

| ANGLE | (2) | F |
|---|---|---|
| 49.0000 | .0050 | 122.9155 |
| 50.0000 | −.1178 | 124.3123 |
| 51.0000 | −.2403 | 125.6989 |
| 52.0000 | −.3624 | 127.0695 |
| 53.0000 | −.4842 | 128.4155 |
| 54.0000 | −.6058 | 129.7284 |
| 55.0000 | −.7272 | 130.9999 |

EXAMPLE 4

Figure 5:
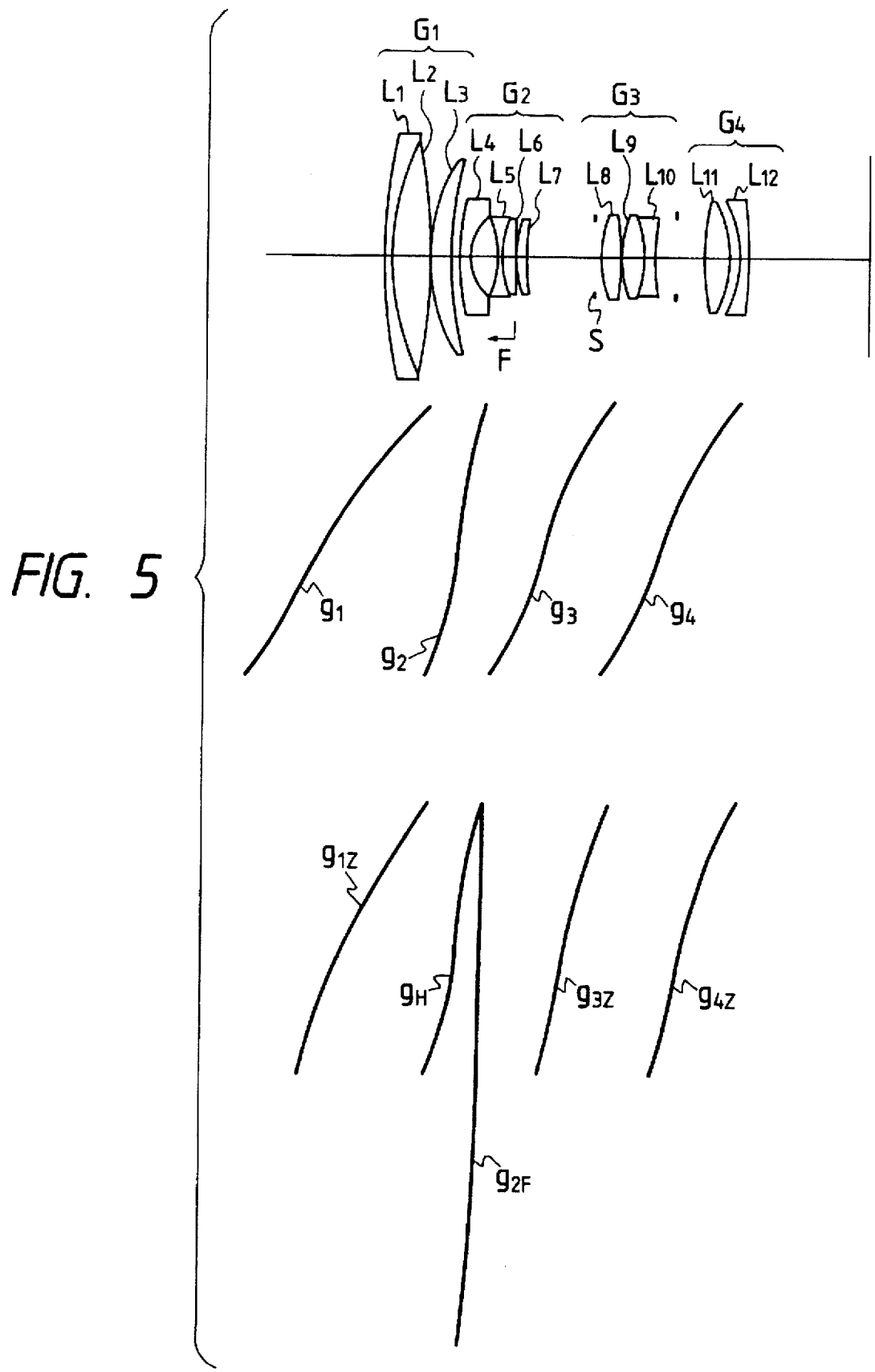
FIG. 5 is a constitutional drawing to show the lens structure of zoom lens in Example 4 according to the present invention together with drawings to show movement loci for zooming of respective lens groups and with drawings to show shapes of cam for focusing, cams for zooming and compensating cam for zooming to define zooming and focusing.

In Example 4, a zoom lens is composed in the order named from the object side, as shown in FIG. 5, of a first lens group G1 of positive refracting power, a second lens group G2 of negative refracting power, a third lens group G3 of positive refracting power, and a fourth lens group G4 of positive refracting power, in which all the lens groups move toward an object along the optical axis during zooming from wide angle to telephoto such that an air gap increases between the first lens group G1 and the second lens group G2, an air gap decreases between the second lens group G2 and the third lens group G3, and an air gap decreases between the third lens group G3 and the fourth lens group G4 and in which the second lens group G2 moves toward the object along the optical axis during focusing.

The construction of each lens group is as follows. The first lens group G1 of positive refracting power is composed of a negative meniscus lens $L_1$ with convex plane on the object side, a double convex lens $L_2$ bonded thereto, and a positive meniscus lens $L_3$ with convex plane on the object side. The second lens group G2 of negative refracting power is composed of a negative meniscus lens $L_4$ with larger curvature plane on the image side, a double concave negative lens $L_5$, a positive meniscus lens $L_6$ bonded thereto, and a positive meniscus lens $L_7$ with convex plane on the object side. The third lens group G3 of positive refracting power is composed of a double convex positive lens $L_8$, a double convex positive lens $L_9$ and a negative lens $L_{10}$ bonded thereto. The fourth lens group G4 of positive refracting power is composed of a double convex positive lens $L_{11}$ and a negative meniscus lens $L_{12}$ with larger curvature plane on the object side. An aperture stop S is provided on the object side of the third lens group G3 as incorporated with the third lens group Table 16 shows specifications of the zoom lens in Example 4. In the table of specifications in Example 4, f represents a focal length (mm) and FN an F-number. In Table 16, r represents a radius of curvature of each lens plane (mm), d an interplanar gap between lenses (mm), n and ν an index of refraction and an Abbe's number of each lens. Accompanying numerals to the characters represent orders counted from the object side.

The middle portion of Table 16 shows values of coefficients defining the shape of an aspherical surface formed on the lens plane $r_6$ on the object side in second lens group G2 and the shape of an aspherical surface formed on the lens plane $r_{22}$ on the object side of negative lens $L_{12}$ in fourth lens group G4. In the middle portion there are described in order from the left values of the conical constant k and the aspherical coefficients of second order, fourth order, sixth order, eighth order and tenth order, $A_2$, $A_4$, $A_6$, $A_8$ and $A_{10}$. $E_{-n}$ means $10^{-n}$ in the values of aspherical coefficients.

The lower portion in Table 16 shows gaps between lens groups and feed amounts for focusing for each photographic distance of infinity and 800.0 mm at three zooming positions (f=28.8, 50.0, and 103.0 mm) between wide angle end and telephoto end.

The bottom portion shows focal lengths of the lens groups, a lateral magnification of the second lens Group G2 at the wide angle end to infinity, and values corresponding to the conditions of the present invention.

The top portion of FIG. 5 is a drawing to show the lens construction of Example 4 according to the present invention, and the middle portion of FIG. 5 shows movement loci ($g_1$, $g_2$, $g_3$, $g_4$) of the lens groups during zooming with variable of rotation angle of the rotation barrel. Table 17 shows numerical values defining the movement loci. In Table 17, the left end column shows rotation angles θ (ANGLE) of rotation barrel, the right end column focal lengths (F), and four columns between the two end columns movement amounts of the lens groups along the optical axis.

As shown in the table, a rotation angle θ for zooming from the wide angle end to the telephoto end is set to 55° in this example in the same manner as in Example 1.

The bottom portion of FIG. 5 shows cam shapes actually formed on the rotation barrel of zoom lens according to the present invention. In FIG. 5, $g_{2F}$ denotes the focus cam for second lens group which is the focusing lens group, $g_{1Z}$, $g_{3Z}$ and $g_{4Z}$ the zoom cams for first lens group, third lens group and fourth lens group, and $g_H$ the compensating zoom cam common to all the lens groups.

During actual zooming, the movement locus $g_2$ of second lens group which is the focusing lens group is formed by a combination of the focus cam $g_{2F}$ with the compensating zoom cam $g_H$. Also, the moving loci $g_1$, $g_3$ and $g_4$ of first lens group, third lens group and fourth lens group taking no part in focusing are formed by combinations of the zoom cams $g_{1Z}$, $g_{3Z}$ and $g_{4Z}$ of first lens group, third lens group and fourth lens group, respectively, with the compensating zoom cam $g_H$.

Table 18 shows numerical values defining the cam trace of the focus cam $g_{2F}$. In Table 18, the left end column and the fourth column show rotation angles θ (ANGLE) of the rotation barrel, the second column and the fifth column movement amounts of the second lens group along the optical axis, and the third column and the right end column focal lengths (F). In the table, the rotation angle θ of rotation barrel of the focus cam $g_{2F}$ is set to 110°, which is a double of the rotation angle 55° for zooming in the same manner as in Example 1.

Table 19 shows numerical values defining the cam loci of the zoom cams $g_{1Z}$, $g_{3Z}$ and $g_{4Z}$ of first lens group G1, third lens group G3 and fourth lens group G4. In Table 19, the left end column shows rotation angles θ (ANGLE) of the rotation barrel, the right end column focal lengths (F), and three columns between the two end columns movement amounts of the lens groups along the optical axis. The rotation angle θ for zooming from the wide angle to the telephoto end is set to 55° identical to that in Table 17.

Table 20 shows numerical values defining the cam locus of the compensating zoom cam $g_H$ common to all the lens groups. In Table 20, the left end column shows rotation angles θ (ANGLE) of the rotation barrel, the second column movement amounts of all the lens groups along the optical axis, and the right end column focal lengths (F).

As described above, during actual zooming, the movement locus $g_2$ of the second lens group which is the focusing lens group is formed by a combination of the focus cam $g_{2F}$ with the compensating zoom cam $g_H$, and the movement loci $g_1$, $g_3$ and $g_4$ of first lens group, third lens group and fourth lens group taking no part in focusing are formed by combinations of the zoom cams $g_{1Z}$, $g_{3Z}$ and $g_{4Z}$ of first lens group, third lens group and fourth lens group, respectively, with the compensating zoom cam $g_H$. Therefore, if the movement amounts along the optical axis in Table 18 and Table 19 are added to the movement amounts along the optical axis in Table 20 in correspondence with each other, the sums should correspond to the movement amounts along the optical axis in Table 17.

TABLE 17-continued

| ANGLE | (1) | (2) | (3) | (4) | F |
|---|---|---|---|---|---|
| 9.0000 | 7.7439 | 1.6972 | 5.4442 | 6.5592 | 38.6744 |
| 10.0000 | 8.6169 | 1.9334 | 6.0290 | 7.2510 | 39.8855 |
| 11.0000 | 9.4849 | 2.1745 | 6.6048 | 7.9275 | 41.1103 |
| 12.0000 | 10.3448 | 2.4181 | 7.1694 | 8.5863 | 42.3452 |

TABLE 16 f = 28.8–103.0   FN = 3.5–4.9

| r1 = 150.000 | d1 = 1.600 | n1 = 1.86074 | v1 = 23.0 | L1 |
| r2 = 65.193 | d2 = 7.500 | n2 = 1.51680 | v2 = 64.1 | L2 |
| r3 = −201.063 | d3 = .100 | | | |
| r4 = 38.552 | d4 = 4.700 | n3 = 1.67025 | v3 = 57.6 | L3 |
| r5 = 92.468 | d5 = 2.014 | | | |
| r6 = 50.334 | d6 = 1.500 | n4 = 1.74443 | v4 = 49.5 | L4 |
| r7 = 11.892 | d7 = 6.000 | | | |
| r8 = −30.162 | d8 = 1.200 | n5 = 1.77279 | v5 = 49.4 | L5 |
| r9 = 21.082 | d9 = 2.500 | n6 = 1.86074 | v6 = 23.0 | L6 |
| r10 = 89.406 | d10 = .400 | | | |
| r11 = 26.791 | d11 = 2.300 | n7 = 1.86074 | v7 = 23.0 | L7 |
| r12 = 47.408 | d12 = 14.581 | | | |
| r13 = .000 | d13 = 1.500 | | | |
| r14 = 31.605 | d14 = 4.000 | n8 = 1.50137 | v8 = 56.5 | L8 |
| r15 = −56.214 | d15 = .100 | | | |
| r16 = 22.191 | d16 = 5.000 | n9 = 1.56384 | v9 = 60.8 | L9 |
| r17 = −24.447 | d17 = 2.000 | n10 = 1.80384 | v10 = 33.9 | L10 |
| r18 = 39.928 | d18 = 4.500 | | | |
| r19 = .000 | d19 = 6.093 | | | |
| r20 = 38.981 | d20 = 6.000 | n11 = 1.62041 | v11 = 60.3 | L11 |
| r21 = −25.650 | d21 = 2.300 | | | |
| r22 = −27.587 | d22 = 1.800 | n12 = 1.86994 | v12 = 39.8 | L12 |
| r23 = −93.762 | d23 = 43.415 | | | |

| r6 = .1000E + 01 | .0000 | −.1355E − 05 | −.1877E − 07 | −.5232E − 11 | −.7221E − 13 |
| r22 = .1000E + 01 | .0000 | −.2159E − 04 | −.3769E − 07 | −.1285E − 09 | .4333E − 12 |

| | pos (1) | pos (2) | pos (3) | pos (4) | pos (5) | pos (6) |
|---|---|---|---|---|---|---|
| f&b | 28.800 | 50.000 | 103.000 | −.040 | −.066 | −.120 |
| d0 | .000 | .000 | .000 | 678.896 | 663.592 | 642.203 |
| d5 | 2.014 | 13.477 | 27.014 | 1.316 | 12.289 | 24.153 |
| d12 | 14.581 | 8.142 | 1.416 | 15.280 | 9.329 | 4.277 |
| d19 | 6.093 | 4.215 | 3.065 | 6.093 | 4.215 | 3.065 |
| d23 | 43.415 | 55.574 | 71.302 | 43.415 | 55.574 | 71.302 |

| | F | (1) | (2) | (3) | (4) | R (mm) |
|---|---|---|---|---|---|---|
| 1 | 28.8000 | .0000 | .6983 | .0000 | .0000 | 800.00 |
| 2 | 50.0000 | .0000 | 1.1876 | .0000 | .0000 | 800.00 |
| 3 | 103.0000 | .0000 | 2.8609 | .0000 | .0000 | 800.00 |

| f1 = 74.000 | f2 = −14.650 | f3 = 39.000 | f4 = 51.000 | β = −.293 |

(1) 5.05
(2) 2.73
(3) 17.86
(4) 1.31

TABLE 17

| ANGLE | (1) | (2) | (3) | (4) | F |
|---|---|---|---|---|---|
| .0000 | .0000 | .0000 | .0000 | .0000 | 28.8000 |
| 1.0000 | .8574 | .1623 | .6400 | .7493 | 29.7996 |
| 2.0000 | 1.7101 | .3257 | 1.2628 | 1.4926 | 30.8214 |
| 3.0000 | 2.5608 | .4928 | 1.8726 | 2.2307 | 31.8668 |
| 4.0000 | 3.4121 | .6661 | 2.4734 | 2.9641 | 32.9370 |
| 5.0000 | 4.2668 | .8482 | 3.0690 | 3.6933 | 34.0333 |
| 6.0000 | 5.1275 | 1.0420 | 3.6632 | 4.4188 | 35.1565 |
| 7.0000 | 5.9959 | 1.2492 | 4.2587 | 5.1402 | 36.3064 |
| 8.0000 | 6.8691 | 1.4683 | 4.8532 | 5.8547 | 37.4802 |

TABLE 17-continued

| ANGLE | (1) | (2) | (3) | (4) | F |
|---|---|---|---|---|---|
| 13.0000 | 11.1937 | 2.6617 | 7.7204 | 9.2255 | 43.5875 |
| 14.0000 | 12.0289 | 2.9031 | 8.2558 | 9.8434 | 44.8339 |
| 15.0000 | 12.8482 | 3.1404 | 8.7741 | 10.4388 | 46.0819 |
| 16.0000 | 13.6495 | 3.3715 | 9.2737 | 11.0107 | 47.3293 |
| 17.0000 | 14.4310 | 3.5951 | 9.7538 | 11.5586 | 48.5738 |
| 18.0000 | 15.1903 | 3.8095 | 10.2128 | 12.0812 | 49.8115 |
| 19.0000 | 15.9234 | 4.0130 | 10.6487 | 12.5768 | 51.0361 |
| 20.0000 | 16.6310 | 4.2057 | 11.0628 | 13.0470 | 52.2481 |
| 21.0000 | 17.3154 | 4.3882 | 11.4572 | 13.4944 | 53.4501 |

TABLE 17-continued

| ANGLE | (1) | (2) | (3) | (4) | F |
|---|---|---|---|---|---|
| 22.0000 | 17.9784 | 4.5613 | 11.8338 | 13.9211 | 54.6449 |
| 23.0000 | 18.6217 | 4.7254 | 12.1942 | 14.3292 | 55.8349 |
| 24.0000 | 19.2469 | 4.8811 | 12.5398 | 14.7202 | 57.0224 |
| 25.0000 | 19.8553 | 5.0288 | 12.8719 | 15.0958 | 58.2093 |
| 26.0000 | 20.4475 | 5.1688 | 13.1913 | 15.4569 | 59.3965 |
| 27.0000 | 21.0237 | 5.3013 | 13.4984 | 15.8040 | 60.5838 |
| 28.0000 | 21.5841 | 5.4264 | 13.7939 | 16.1379 | 61.7711 |
| 29.0000 | 22.1290 | 5.5445 | 14.0783 | 16.4592 | 62.9584 |
| 30.0000 | 22.6588 | 5.6557 | 14.3520 | 16.7684 | 64.1454 |
| 31.0000 | 23.1736 | 5.7603 | 14.6156 | 17.0661 | 65.3320 |
| 32.0000 | 23.6739 | 5.8586 | 14.8695 | 17.3529 | 66.5184 |
| 33.0000 | 24.1600 | 5.9507 | 15.1142 | 17.6292 | 67.7042 |
| 34.0000 | 24.6321 | 6.0370 | 15.3501 | 17.8955 | 68.8888 |
| 35.0000 | 25.0902 | 6.1176 | 15.5775 | 18.1520 | 70.0716 |
| 36.0000 | 25.5353 | 6.1933 | 15.7974 | 18.3999 | 71.2528 |
| 37.0000 | 25.9697 | 6.2666 | 16.0131 | 18.6422 | 72.4356 |
| 38.0000 | 26.3962 | 6.3399 | 16.2278 | 18.8819 | 73.6234 |
| 39.0000 | 26.8170 | 6.4154 | 16.4443 | 19.1218 | 74.8199 |
| 40.0000 | 27.2346 | 6.4953 | 16.6656 | 19.3649 | 76.0285 |
| 41.0000 | 27.6514 | 6.5818 | 16.8945 | 19.6139 | 77.2538 |
| 42.0000 | 28.0703 | 6.6773 | 17.1341 | 19.8720 | 78.5006 |
| 43.0000 | 28.4941 | 6.7846 | 17.3880 | 20.1429 | 79.7746 |
| 44.0000 | 28.9265 | 6.9070 | 17.6605 | 20.4309 | 81.0828 |
| 45.0000 | 29.3720 | 7.0489 | 17.9571 | 20.7418 | 82.4345 |
| 46.0000 | 29.8369 | 7.2164 | 18.2856 | 21.0835 | 83.8426 |
| 47.0000 | 30.3306 | 7.4186 | 18.6574 | 21.4678 | 85.3261 |
| 48.0000 | 30.8651 | 7.6676 | 19.0875 | 21.9102 | 86.9107 |
| 49.0000 | 31.4513 | 7.9738 | 19.5689 | 22.4246 | 88.6215 |
| 50.0000 | 32.1021 | 8.3504 | 20.1771 | 23.0277 | 90.4872 |
| 51.0000 | 32.8312 | 8.8122 | 20.8694 | 23.7386 | 92.5380 |
| 52.0000 | 33.6545 | 9.3764 | 21.6850 | 24.5788 | 94.8091 |
| 53.0000 | 34.5846 | 10.0563 | 22.6380 | 25.5652 | 97.3310 |
| 54.0000 | 35.6145 | 10.8456 | 23.7176 | 26.6897 | 100.0948 |
| 55.0000 | 36.6939 | 11.6940 | 24.8591 | 27.8866 | 102.9995 |

TABLE 18

| ANGLE | (2) | F | ANGLE | (2) | F |
|---|---|---|---|---|---|
| .0000 | .0000 | 28.8000 | | | |
| 1.0000 | .0057 | 29.7996 | 56.0000 | .7243 | .0000 |
| 2.0000 | .0114 | 30.8214 | 57.0000 | .7509 | .0000 |
| 3.0000 | .0172 | 31.8668 | 58.0000 | .7783 | .0000 |
| 4.0000 | .0229 | 32.9370 | 59.0000 | .8065 | .0000 |
| 5.0000 | .0287 | 34.0333 | 60.0000 | .8355 | .0000 |
| 6.0000 | .0345 | 35.1565 | 61.0000 | .8654 | .0000 |
| 7.0000 | .0403 | 36.3064 | 62.0000 | .8962 | .0000 |
| 8.0000 | .0462 | 37.4802 | 63.0000 | .9279 | .0000 |
| 9.0000 | .0522 | 38.6744 | 64.0000 | .9605 | .0000 |
| 10.0000 | .0583 | 39.8855 | 65.0000 | .9941 | .0000 |
| 11.0000 | .0645 | 41.1103 | 66.0000 | 1.0286 | .0000 |
| 12.0000 | .0709 | 42.3452 | 67.0000 | 1.0640 | .0000 |
| 13.0000 | .0775 | 43.5875 | 68.0000 | 1.1004 | .0000 |
| 14.0000 | .0843 | 44.8339 | 69.0000 | 1.1377 | .0000 |
| 15.0000 | .0913 | 46.0819 | 70.0000 | 1.1760 | .0000 |
| 16.0000 | .0986 | 47.3293 | 71.0000 | 1.2153 | .0000 |
| 17.0000 | .1063 | 48.5738 | 72.0000 | 1.2555 | .0000 |
| 18.0000 | .1142 | 49.8115 | 73.0000 | 1.2967 | .0000 |
| 19.0000 | .1226 | 51.0361 | 74.0000 | 1.3388 | .0000 |
| 20.0000 | .1315 | 52.2481 | 75.0000 | 1.3819 | .0000 |
| 21.0000 | .1409 | 53.4501 | 76.0000 | 1.4258 | .0000 |
| 22.0000 | .1506 | 54.6449 | 77.0000 | 1.4707 | .0000 |
| 23.0000 | .1606 | 55.8349 | 78.0000 | 1.5166 | .0000 |
| 24.0000 | .1710 | 57.0224 | 79.0000 | 1.5635 | .0000 |
| 25.0000 | .1816 | 58.2093 | 80.0000 | 1.6113 | .0000 |
| 26.0000 | .1925 | 59.3965 | 81.0000 | 1.6602 | .0000 |
| 27.0000 | .2037 | 60.5838 | 82.0000 | 1.7101 | .0000 |
| 28.0000 | .2152 | 61.7711 | 83.0000 | 1.7611 | .0000 |
| 29.0000 | .2270 | 62.9584 | 84.0000 | 1.8132 | .0000 |
| 30.0000 | .2391 | 64.1454 | 85.0000 | 1.8663 | .0000 |
| 31.0000 | .2516 | 65.3320 | 86.0000 | 1.9205 | .0000 |
| 32.0000 | .2645 | 66.5184 | 87.0000 | 1.9758 | .0000 |
| 33.0000 | .2778 | 67.7042 | 88.0000 | 2.0323 | .0000 |
| 34.0000 | .2916 | 68.8888 | 89.0000 | 2.0899 | .0000 |

TABLE 18-continued

| ANGLE | (2) | F | ANGLE | (2) | F |
|---|---|---|---|---|---|
| 35.0000 | .3058 | 70.0716 | 90.0000 | 2.1486 | .0000 |
| 36.0000 | .3205 | 71.2528 | 91.0000 | 2.2084 | .0000 |
| 37.0000 | .3357 | 72.4356 | 92.0000 | 2.2693 | .0000 |
| 38.0000 | .3514 | 73.6234 | 93.0000 | 2.3312 | .0000 |
| 39.0000 | .3675 | 74.8199 | 94.0000 | 2.3942 | .0000 |
| 40.0000 | .3840 | 76.0285 | 95.0000 | 2.4583 | .0000 |
| 41.0000 | .4010 | 77.2538 | 96.0000 | 2.5234 | .0000 |
| 42.0000 | .4185 | 78.5006 | 97.0000 | 2.5897 | .0000 |
| 43.0000 | .4365 | 79.7746 | 98.0000 | 2.6570 | .0000 |
| 44.0000 | .4551 | 81.0828 | 99.0000 | 2.7256 | .0000 |
| 45.0000 | .4742 | 82.4345 | 100.0000 | 2.7954 | .0000 |
| 46.0000 | .4938 | 83.8425 | 101.0000 | 2.8664 | .0000 |
| 47.0000 | .5140 | 85.3261 | 102.0000 | 2.9387 | .0000 |
| 48.0000 | .5348 | 86.9107 | 103.0000 | 3.0124 | .0000 |
| 49.0000 | .5563 | 88.6215 | 104.0000 | 3.0874 | .0000 |
| 50.0000 | .5784 | 90.4872 | 105.0000 | 3.1639 | .0000 |
| 51.0000 | .6011 | 92.5380 | 106.0000 | 3.2416 | .0000 |
| 52.0000 | .6244 | 94.8091 | 107.0000 | 3.3201 | .0000 |
| 53.0000 | .6484 | 97.3310 | 108.0000 | 3.3995 | .0000 |
| 54.0000 | .6730 | 100.0948 | 109.0000 | 3.4792 | .0000 |
| 55.0000 | .6983 | 102.9995 | 110.0000 | 3.5592 | .0000 |

TABLE 19

| ANGLE | (1) | (3) | (4) | F |
|---|---|---|---|---|
| .0000 | .0000 | .0000 | .0000 | 28.8000 |
| 1.0000 | .7009 | .4834 | .5927 | 29.7996 |
| 2.0000 | 1.3958 | .9485 | 1.1784 | 30.8214 |
| 3.0000 | 2.0852 | 1.3970 | 1.7551 | 31.8668 |
| 4.0000 | 2.7689 | 1.8302 | 2.3210 | 32.9370 |
| 5.0000 | 5.4472 | 2.2494 | 2.8738 | 34.0333 |
| 6.0000 | 4.1200 | 2.6558 | 3.4114 | 35.1565 |
| 7.0000 | 4.7870 | 3.0498 | 5.9314 | 36.3064 |
| 8.0000 | 5.4470 | 3.4311 | 4.4326 | 37.4802 |
| 9.0000 | 6.0989 | 3.7992 | 4.9142 | 38.6744 |
| 10.0000 | 6.7418 | 4.1538 | 5.3759 | 39.8855 |
| 11.0000 | 7.3749 | 4.4948 | 5.8174 | 41.1103 |
| 12.0000 | 7.9976 | 4.8222 | 6.2391 | 42.3452 |
| 13.0000 | 8.6095 | 5.1362 | 6.6413 | 43.5875 |
| 14.0000 | 9.2101 | 5.4370 | 7.0246 | 44.8339 |
| 15.0000 | 9.7992 | 5.7251 | 7.3898 | 46.0819 |
| 16.0000 | 10.3766 | 6.0009 | 7.7378 | 47.3293 |
| 17.0000 | 10.9422 | 6.2649 | 8.0697 | 48.5738 |
| 18.0000 | 11.4950 | 6.5175 | 8.3859 | 49.8115 |
| 19.0000 | 12.0330 | 6.7583 | 8.6864 | 51.0361 |
| 20.0000 | 12.5569 | 6.9887 | 8.9729 | 52.2481 |
| 21.0000 | 13.0681 | 7.2099 | 9.2470 | 53.4501 |
| 22.0000 | 13.5677 | 7.4231 | 9.5104 | 54.6449 |
| 23.0000 | 14.0570 | 7.6294 | 9.7644 | 55.8349 |
| 24.0000 | 14.5368 | 7.8297 | 10.0102 | 57.0224 |
| 25.0000 | 15.0081 | 8.0247 | 10.2486 | 58.2093 |
| 26.0000 | 15.4712 | 8.2150 | 10.4806 | 59.3965 |
| 27.0000 | 15.9261 | 8.4008 | 10.7064 | 60.5838 |
| 28.0000 | 16.3728 | 8.5826 | 10.9266 | 61.7711 |
| 29.0000 | 16.8115 | 8.7607 | 11.1416 | 62.9584 |
| 30.0000 | 17.2421 | 8.9354 | 11.3518 | 64.1454 |
| 31.0000 | 17.6649 | 9.1069 | 11.5574 | 65.3320 |
| 32.0000 | 18.0798 | 9.2754 | 11.7588 | 66.5184 |
| 33.0000 | 18.4871 | 9.4413 | 11.9563 | 67.7042 |
| 34.0000 | 18.8867 | 9.6047 | 12.1501 | 68.8888 |
| 35.0000 | 19.2784 | 9.7657 | 12.3403 | 70.0716 |
| 36.0000 | 19.6625 | 9.9246 | 12.5271 | 71.2528 |
| 37.0000 | 20.0388 | 10.0822 | 12.7113 | 72.4356 |
| 38.0000 | 20.4076 | 10.2392 | 12.8933 | 75.6234 |
| 39.0000 | 20.7691 | 10.3964 | 13.0739 | 74.8199 |
| 40.0000 | 21.1233 | 10.5543 | 13.2535 | 76.0285 |
| 41.0000 | 21.4706 | 10.7137 | 13.4331 | 77.2538 |
| 42.0000 | 21.8115 | 10.8753 | 13.6132 | 78.5006 |
| 43.0000 | 22.1460 | 11.0399 | 13.7948 | 79.7746 |
| 44.0000 | 22.4746 | 11.2086 | 13.9790 | 81.0828 |
| 45.0000 | 22.7975 | 11.3824 | 14.1671 | 82.4345 |
| 46.0000 | 23.1144 | 11.5630 | 14.3609 | 83.8426 |
| 47.0000 | 23.4260 | 11.7528 | 14.5632 | 85.3261 |

TABLE 19-continued

| ANGLE | (1) | (3) | (4) | F |
|---|---|---|---|---|
| 48.0000 | 23.7324 | 11.9548 | 14.7775 | 86.9107 |
| 49.0000 | 24.0338 | 12.1713 | 15.0070 | 88.6215 |
| 50.0000 | 24.3301 | 12.4051 | 15.2557 | 90.4872 |
| 51.0000 | 24.6200 | 12.6582 | 15.5274 | 92.5380 |
| 52.0000 | 24.9026 | 12.9330 | 15.8268 | 94.8091 |
| 53.0000 | 25.1767 | 13.2302 | 16.1574 | 97.3310 |
| 54.0000 | 25.4419 | 13.5450 | 16.5171 | 100.0948 |
| 55.0000 | 25.6983 | 13.8635 | 16.8910 | 102.9995 |

TABLE 20

| ANGLE | (2) | F |
|---|---|---|
| .0000 | .0000 | 28.8000 |
| 1.0000 | .1566 | 29.7996 |
| 2.0000 | .3142 | 30.8214 |
| 3.0000 | .4756 | 31.8668 |
| 4.0000 | .6432 | 32.9370 |
| 5.0000 | .8195 | 34.0333 |
| 6.0000 | 1.0075 | 35.1565 |
| 7.0000 | 1.2089 | 36.3064 |
| 5.0000 | 1.4221 | 37.4802 |
| 9.0000 | 1.6450 | 38.6744 |
| 10.0000 | 1.8751 | 39.8855 |
| 11.0000 | 2.1100 | 41.1103 |
| 12.0000 | 2.3472 | 42.3452 |
| 13.0000 | 2.5842 | 45.5875 |
| 14.0000 | 2.8189 | 44.8339 |
| 15.0000 | 3.0490 | 46.0819 |
| 16.0000 | 3.2729 | 47.3293 |
| 17.0000 | 3.4889 | 48.5738 |
| 18.0000 | 3.6953 | 49.8115 |
| 19.0000 | 3.8903 | 51.0361 |
| 20.0000 | 4.0741 | 52.2481 |
| 21.0000 | 4.2473 | 53.4501 |
| 22.0000 | 4.4107 | 54.6449 |
| 23.0000 | 4.5648 | 55.8349 |
| 24.0000 | 4.7101 | 57.0224 |
| 25.0000 | 4.8472 | 58.2093 |
| 26.0000 | 4.9763 | 59.3965 |
| 27.0000 | 5.0976 | 60.5838 |
| 28.0000 | 5.2115 | 61.7711 |
| 29.0000 | 5.3176 | 62.9584 |
| 30.0000 | 5.4166 | 64.1454 |
| 31.0000 | 5.5087 | 65.3320 |
| 32.0000 | 5.5940 | 66.5184 |
| 33.0000 | 5.6729 | 67.7042 |
| 34.0000 | 5.7454 | 68.8888 |
| 35.0000 | 5.8118 | 70.0716 |
| 36.0000 | 5.8728 | 71.2528 |
| 37.0000 | 5.9309 | 72.4356 |
| 38.0000 | 5.9885 | 73.6234 |
| 39.0000 | 6.0480 | 74.8199 |
| 40.0000 | 6.1113 | 76.0285 |
| 41.0000 | 6.1808 | 77.2538 |
| 42.0000 | 6.2588 | 78.5006 |
| 43.0000 | 6.3481 | 79.7746 |
| 44.0000 | 6.4519 | 81.0828 |
| 45.0000 | 6.5747 | 82.4345 |
| 46.0000 | 6.7226 | 83.8426 |
| 47.0000 | 6.9046 | 85.3261 |
| 48.0000 | 7.1327 | 86.9107 |
| 49.0000 | 7.4175 | 88.6215 |
| 50.0000 | 7.7720 | 90.4872 |
| 51.0000 | 8.2112 | 92.5380 |
| 52.0000 | 8.7520 | 94.8091 |
| 53.0000 | 9.4079 | 97.3310 |
| 54.0000 | 10.1726 | 100.0948 |
| 55.0000 | 10.9956 | 102.9995 |

As described above, the present invention can provide a compact and wide ratio zoom lens in the simple focusing method with second lens group which shows excellent imaging property in the entire zoom range and at any photographic distance while minimizing the aberration change.

The manual focus of internal focusing zoom lens with second lens group changing the feed amount for focusing can be achieved in a very simple arrangement of double structure (fixed barrel and cam barrel), in which the barrel structure is so arranged that during zooming the movement locus of second lens group which is the focusing lens group is formed by a combination of focus cam with compensating zoom cam and the movement loci of first lens group, third lens group and fourth lens group taking no part in focusing are formed by combinations of zoom cams of first lens group, third lens group and fourth lens group, respectively, with the compensating zoom cam.

What is claimed is:

1. An internal focusing zoom lens system comprising a first lens group of positive refracting power, a second lens group of negative refracting power, a third lens group of positive refracting power, and a fourth lens group of positive refracting power disposed in the named order from the object side, in which at least said first lens group, said third lens group and said fourth lens group move toward an object during zooming from wide angle to telephoto such that a first air gap increases between said first lens group and said second lens group, a second air gap decreases between said second lens group and said third lens group, and a third air gap decreases between said third lens group and said fourth lens group, and said second lens group is located near to the object side at telephoto end as compared to at wide angle end, and in which said second lens group moves toward the object during focusing and the following conditions are satisfied:

$$3.0 < f_1/-f_2 < 6.0 \tag{1};$$

$$2.2 < -f_2/(f_w^{1/2}) < 3.3 \tag{2};$$

$$15.0 < f_1^2 \cdot \beta_{2w}^2/(1-\beta_{2w}^2) \cdot f_w < 35.0 \tag{3};$$

where $f_1$: a focal length of said first lens group;

$f_2$: a focal length of said second lens group;

$\beta_{2w}$: a lateral magnification of said second lens group at wide angle end to infinity;

$f_w$: a focal length of the overall system at wide angle end.

2. An internal focusing zoom lens system according to claim 1, which further satisfies the following condition:

$$0.8 < f_2/f_3 < 3.0 \tag{4};$$

where $f_3$: a focal length of said third lens group;

$f_4$: a focal length of said fourth lens group.

3. An internal focusing zoom lens system according to claim 1, which further satisfies the following condition:

$$1.0 \leq f_4/f_3 \leq 2.0;$$

where $f_3$: a focal length of said third lens group;

$f_4$: a focal length of said fourth lens group.

4. An internal focusing zoom lens system according to claim 1, wherein if a certain movement locus for zooming is expressed with a variable of rotation angle of a rotation barrel for defining a displacement amount of a lens group along an optical axis, a movement locus of said second lens group which is a focusing lens group is formed by a combination of a focus cam with a compensating zoom cam and movement loci of said first lens group, said third lens group and said fourth lens group which are movable non-focusing lens groups taking no part in focusing are formed by combinations of respective zoom cams corresponding to the first, third and fourth lens groups with said compensating zoom cam.

5. An internal focusing zoom lens system according to claim 2, wherein if a certain movement locus for zooming is expressed with a variable of rotation angle of a rotation barrel for defining a displacement amount of a lens group along an optical axis, a movement locus of said second lens group which is a focusing lens group is formed by a combination of a focus cam with a compensating zoom cam and movement loci of said first lens group, said third lens group and said fourth lens group which are movable non-focusing lens groups taking no part in focusing are formed by combinations of respective zoom cams corresponding to the first, third and fourth lens groups with said compensating zoom cam.

6. An internal focusing zoom lens system according to claim 3, wherein if a certain movement locus for zooming is expressed with a variable of rotation angle of a rotation barrel for defining a displacement amount of a lens group along an optical axis, a movement locus of said second lens group which is a focusing lens group is formed by a combination of a focus cam with a compensating zoom cam and movement loci of said first lens group, said third lens group and said fourth lens group which are movable non-focusing lens groups taking no part in focusing are formed by combinations of respective zoom cams corresponding to the first, third and fourth lens groups with said compensating cam.

7. An internal focusing zoom lens system according to claim 4, wherein shapes of said focus cam, said compensating zoom cam and said zoom cams corresponding to said first, third and fourth lens groups all are nonlinear.

8. An internal focusing zoom lens system according to claim 5, wherein shapes of said focus cam, said compensating zoom cam and said zoom cams corresponding to said first, third and fourth lens groups all are nonlinear.

9. An internal focusing zoom lens system according to claim 6, wherein shapes of said focus cam, said compensating zoom cam and said zoom cams corresponding to said first, third and fourth lens groups all are nonlinear.

10. An internal focusing zoom lens system according to claim 1, which is constructed in accordance with the following lens specifications:

| f = 36.0–103.0 | | FN = 3.6–4.6 | | |
|---|---|---|---|---|
| r1 = 113.125 | d1 = 1.500 | n1 = 1.86074 | v1 = 23.0 | L1 |
| r2 = 58.096 | d2 = 8.000 | n2 = 1.51860 | v2 = 70.1 | L2 |
| r3 = −132.377 | d3 = .100 | | | |
| r4 = 33.865 | d4 = 3.800 | n3 = 1.65160 | v3 = 58.5 | L3 |
| r5 = 57.386 | d5 = 2.285 | | | |
| r6 = 52.180 | d6 = 1.500 | n4 = 1.67025 | v4 = 57.6 | L4 |
| r7 = 12.729 | d7 = 5.100 | | | |
| r8 = −25.386 | d8 = 1.100 | n5 = 1.74810 | v5 = 52.3 | L5 |
| r9 = 33.461 | d9 = 2.300 | n6 = 1.86074 | v6 = 25.0 | L6 |
| r10 = 164.298 | d10 = .100 | | | |
| r11 = 26.737 | d11 = 1.900 | n7 = 1.80458 | v7 = 25.5 | L7 |
| r12 = 48.903 | d12 = 14.399 | | | |
| r13 = .000 | d15 = 1.000 | | | |
| r14 = 48.706 | d14 = 3.500 | n8 = 1.51860 | v8 = 70.1 | L8 |
| r15 = −40.457 | d15 = .100 | | | |
| r16 = 20.794 | d16 = 6.200 | n9 = 1.50137 | v9 = 56.5 | L9 |
| r17 = −21.868 | d17 = 3.000 | n10 = 1.80384 | v10 = 53.9 | L10 |
| r18 = 64.235 | d18 = 5.600 | | | |
| r19 = .000 | d19 = 3.028 | | | |
| r20 = −2358.593 | d20 = 4.500 | n11 = 1.65844 | v11 = 50.8 | L11 |
| r21 = −23.264 | d21 = .100 | | | |
| r22 = 78.078 | d22 = 3.300 | n12 = 1.62280 | v12 = 57.0 | L12 |
| r23 = −53.919 | d23 = 2.400 | | | |
| r24 = −19.264 | d24 = 1.200 | n13 = 1.79631 | v13 = 40.9 | L13 |
| r25 = −205.722 | d25 = 41.122 | | | |

| r6 = .1000E + 01 | .0000 | −.3459E − 05 | −.6965E− 07 | .4212E − 09 | −.1669E − 11 |
|---|---|---|---|---|---|

| | pos (1) | pos (2) | pos (3) | pos (4) | pos (5) | pos (6) |
|---|---|---|---|---|---|---|
| f&b | 36.000 | 60.000 | 103.000 | −.045 | −.071 | −.106 |
| d0 | .000 | .000 | .000 | 732.865 | 720.108 | 708.079 |
| d5 | 2.285 | 13.128 | 23.354 | 1.249 | 11.258 | 19.276 |
| d12 | 14.399 | 8.209 | 2.011 | 15.435 | 10.079 | 6.088 |
| d19 | 3.028 | 1.779 | 1.119 | 3.028 | 1.779 | 1.119 |
| d25 | 41.122 | 50.475 | 59.138 | 41.122 | 50.475 | 59.138 |

-continued

| | | f = 36.0–103.0 | | FN = 3.6–4.6 | | |
| --- | --- | --- | --- | --- | --- | --- |
| | F | (1) | (2) | (3) | (4) | R (mm) |
| 1 | 36.0000 | .0000 | 1.0357 | .0000 | .0000 | 850.00 |
| 2 | 60.0000 | .0000 | 1.8702 | .0000 | .0000 | 850.00 |
| 3 | 103.0000 | .0000 | 4.0775 | .0000 | .0000 | 850.00 |
| f1 = 71.353 | f2 = −16.808 | f3 = 37.322 | | f4 = 61.710 | $\beta_{2w}$ = −.377 | |

The values obtained by a calculation in each condition
(1) 4.25
(2) 2.80
(3) 23.43
(4) 1.65 wherein in the table of specifications, f represents a focal length (mm), FN an F-number, r a radius of curvature of each lens plane (mm), d an interplanar gap between lenses (mm), n and ν an index of refraction and an Abbe's number of each lens, L represents a lens disposed in the order from the object side, f&b represent focal distance of the entire system and magnification of the entire system, pos(4) represents closest position at wide angle end, pos(5) represents closest position at the middle position, pos(6) represents closest position at telephoto end;

wherein accompanying numerals to the characters (r, d, n, ν, L) represent orders counted from the objective side;

wherein the middle portion of the table shows values of coefficients defining the shape of an aspherical surface formed on the lens plane $r_6$ on the object side in the second lens group;

wherein the aspherical surface is expressed by the following aspherical equation, if a height to the optical axis is h, a distance of a vertex of aspherical surface at h to the tangent plane is x, a conical constant is k, aspherical coefficients of second order, fourth order, sixth order, eighth order and tenth order are $A_2$, $A_4$, $A_6$, $A_8$ and $A_{10}$, respectively, and a paraxial radius of curvature is r:

$$x = \frac{h^2/r}{1 + (1 - kh^2/r^2)^{1/2}} + \sum_{i=1}^{5} A_{2i} \cdot h^{2i}$$

wherein in the middle portion of the specifications of lens system in the table, there are described in order from the left, values of the conical constant k and the aspherical coefficients of second order, fourth order, sixth order, eighth order and tenth order, $A_2$, $A_4$, $A_6$, $A_8$ and $A_{10}$ and wherein E–n means $10^{-n}$ in the values of aspherical coefficients;

wherein the lower portion in the table shows gaps between lens groups and feed amounts of the second lens group for focusing for each photographic distance of infinity and 850.0 mm at three zooming positions (f=36.0, 60.0, and 103.0 mm) between wide angle end and telephoto end;

wherein the bottom portion shows focal lengths of the lens groups, a lateral magnification of the second lens group at the wide angle end to infinity, and values corresponding to the conditions of the present invention;

wherein in the table
$f_1$: a focal length of said first lens group;
$f_2$: a focal length of said second lens group;

$\beta_{2w}$: a lateral magnification of said second lens group at the wide angle end to infinity;
$f_3$: a focal length of said third lens group;
$f_4$: a focal length of said fourth lens group.

11. An internal focusing zoom lens system comprising a first lens group of positive refracting power, a second lens group of negative refracting power, a third lens group of positive refracting power, and a fourth lens group of positive refracting power disposed in the named order from the object side:

in which at least said first lens group, said third lens group and said fourth lens group move toward an object during zooming from wide angle to telephoto such that a first air gap increases between said first lens group and said second lens group, a second air gap decreases between said second lens group and said third lens group, and a third air gap decreases between said third lens group and said fourth lens group, and said second lens group is located near to the object side at telephoto end as compared to at wide angle end;

in which said first lens group comprises at least one positive lens and at least one negative lens, said second lens group comprises at least one negative lens and at least one positive lens, said third lens group comprises at least two positive lenses, and said fourth lens group comprises at least one positive lens and at least one negative lens; and in which said second lens group moves toward the object during focusing and the following conditions are satisfied:

$3.0 < f_1/-f_2 < 6.0$ (1);

$2.2 < -f_2/(f_w^{1/2}) < 3.3$ (2);

$15.0 < f_1^2 \cdot \beta_{2w}^2/(1-\beta_{2w}^2) \cdot f_w < 35.0$ (3);

where
$f_1$: a focal length of said first lens group;
$f_2$: a focal length of said second lens group;
$\beta_{2w}$: a lateral magnification of said second lens group at wide angle end to infinity;
$f_w$: a focal length of the overall system at wide angle end.

12. An internal focusing zoom lens system according to claim 10, which further satisfies the following condition:

$0.8 < f_4/f_3 < 3.0$ (4);

where
$f_3$: a focal length of said third lens group;

$f_4$: a focal length of said fourth lens group.

13. An internal focusing zoom lens system according to claim 11, which further satisfies the following condition:

$$1.0 \leq f_4/f_3 \leq 2.0;$$

where $f_3$: a focal length of said third lens group;

$f_4$: a focal length of said fourth lens group.

14. An internal focusing zoom lens system according to claim 10, wherein if a certain movement locus for zooming is expressed with a variable of rotation angle of a rotation barrel for defining a displacement amount of a lens group along an optical axis, a movement locus of said second lens group which is a focusing lens group is formed by a combination of a focus cam with a compensating zoom cam and movement loci of said first lens group, said third lens group and said fourth lens group which are movable non-focusing lens groups taking no part in focusing are formed by combinations of respective zoom cams corresponding to the first, third and fourth lens groups with said compensating zoom cam.

15. An internal focusing zoom lens system according to claim 12, wherein if a certain movement locus for zooming is expressed with a variable of rotation angle of a rotation barrel for defining a displacement amount of a lens group along an optical axis, a movement locus of said second lens group which is a focusing lens group is formed by a combination of a focus cam with a compensating zoom cam and movement loci of said first lens group, said third lens group and said fourth lens group which are movable non-focusing lens groups taking no part in focusing are formed by combinations of respective zoom cams corresponding to the first, third and fourth lens groups with said compensating zoom cam.

16. An internal focusing zoom lens system according to claim 13, wherein if a certain movement locus for zooming is expressed with a variable of rotation angle of a rotation barrel for defining a displacement amount of a lens group along an optical axis, a movement locus of said second lens group which is a focusing lens group is formed by a combination of a focus cam with a compensating zoom cam and movement loci of said first lens group, said third lens group and said fourth lens group which are movable non-focusing lens groups taking no part in focusing are formed by combinations of respective zoom cams corresponding to the first, third and fourth lens groups with said compensating zoom cam.

17. An internal focusing zoom lens system according to claim 14, wherein shapes of said focus cam, said compensating zoom cam and said zoom cams corresponding to said first, third and fourth lens groups all are nonlinear.

18. An internal focusing zoom lens system according to claim 15, wherein shapes of said focus cam, said compensating zoom cam and said zoom cams corresponding to said first, third and fourth lens groups all are nonlinear.

19. An internal focusing zoom lens system according to claim 16, wherein shapes of said focus cam, said compensating zoom cam and said zoom cams corresponding to said first, third and fourth lens groups all are nonlinear.

20. An internal focusing zoom lens system having the following lens specifications:

| f = 28.8–82.5 | | FN = 3.5–4.6 | | |
|---|---|---|---|---|
| r1 = 150.000 | d1 = 1.600 | n1 = 1.86074 | v1 = 23.0 | L1 |
| r2 = 65.662 | d2 = 7.500 | n2 = 1.51680 | v2 = 64.1 | L2 |
| r3 = −215.232 | d3 = .100 | | | |
| r4 = 38.087 | d4 = 4.700 | n3 = 1.67025 | v3 = 57.6 | L3 |
| r5 = 91.398 | d5 = 1.970 | | | |
| r6 = 49.175 | d6 = 1.500 | n4 = 1.74443 | v4 = 49.5 | L4 |
| r7 = 11.831 | d7 = 6.000 | | | |
| r8 = −30.429 | d8 = 1.200 | n5 = 1.77279 | v5 = 49.4 | L5 |
| r9 = 21.445 | d9 = 2.500 | n6 = 1.86074 | v6 = 23.0 | L6 |
| r10 = 86.170 | d10 = .400 | | | |
| r11 = 26.495 | d11 = 2.300 | n7 = 1.86074 | v7 = 23.0 | L7 |
| r12 = 46.960 | d12 = 14.351 | | | |
| r13 = .000 | d13 = 1.500 | | | |
| r14 = 32.464 | d14 = 4.000 | n8 = 1.50137 | v8 = 56.5 | L8 |
| r15 = −57.234 | d15 = .100 | | | |
| r16 = 22.372 | d16 = 5.000 | n9 = 1.56384 | v9 = 60.8 | L9 |
| r17 = −24.520 | d17 = 2.000 | n10 = 1.80384 | v10 = 33.9 | L10 |
| r18 = 42.215 | d18 = 4.500 | | | |
| r19 = .000 | d19 = 6.189 | | | |
| r20 = 39.500 | d20 = 6.000 | n11 = 1.62041 | v11 = 60.3 | L11 |
| r21 = −25.592 | d21 = 2.300 | | | |
| r22 = −27.661 | d22 = 1.800 | n12 = 1.86994 | v12 = 39.8 | L12 |
| r23 = −92.686 | d23 = 43.476 | | | |

| | | | | | |
|---|---|---|---|---|---|
| r6 = .1000E + 01 | .0000 | −.3172E − 06 | −.2020E − 07 | −.9068E − 11 | −.4289E − 13 |
| r22 = .1000E + 01 | .0000 | −.2180E − 04 | −.3723E − 07 | −.1199E − 09 | .4587E − 12 |

| | pos (1) | pos (2) | pos (3) | pos (4) | pos (5) | pos (6) |
|---|---|---|---|---|---|---|
| f&b | 28.800 | 50.000 | 82.500 | −.055 | −.090 | −.135 |
| d0 | .000 | .000 | .000 | 479.014 | 463.709 | 449.283 |
| d5 | 1.970 | 13.433 | 23.791 | 1.011 | 11.831 | 20.879 |
| d12 | 14.351 | 7.912 | 3.354 | 15.310 | 9.514 | 6.265 |
| d19 | 6.189 | 4.311 | 3.311 | 6.189 | 4.311 | 3.311 |
| d23 | 43.476 | 55.635 | 65.261 | 43.476 | 55.635 | 65.261 |

-continued

| | | f = 28.8–82.5 | | FN = 3.5–4.6 | | |
|---|---|---|---|---|---|---|
| | F | (1) | (2) | (3) | (4) | R (mm) |
| 1 | 28.8000 | .0000 | .9590 | .0000 | .0000 | 600.00 |
| 2 | 50.0000 | .0000 | 1.6022 | .0000 | .0000 | 600.00 |
| 3 | 82.5000 | .0000 | 2.9112 | .0000 | .0000 | 600.00 |
| f1 = 74.000 | f2 = –14.650 | | f3 = 39.000 | | f4 = 51.000 | $\beta_{2w} = -.293$ | the values obtained by a calculation in each condition
(1) 5.05
(2) 2.73
(3) 17.86
(4) 1.31 wherein in the table of specifications, f represents a focal length (mm), FN an F-number, r a radius of curvature of each lens plane (mm), d an interplanar gap between lenses (mm), n and ν an index of refraction and an Abbe's number of each lens, L represents a lens disposed in the order from the object side, f&b represent focal distance of the entire system and magnification of the entire system, pos(4) represents closest position at wide angle end, pos(5) represents closest position at the middle position, pos(6) represents closest position at telephoto end;

wherein accompanying numerals to the characters represent orders counted from the object side;

wherein the middle portion of the table shows values of coefficients defining the shape of an aspherical surface formed on the lens plane $r_6$ on the object side in a second lens group and the shape of an aspherical surface formed on the lens plane $r_{22}$ on the object side of negative lens $L_{12}$ in a fourth lens group;

wherein the aspherical surface is expressed by the following aspherical equation, if a height to the optical axis is h, a distance of a vertex of aspherical surface at h to the tangent plane is x, a conical constant is k, aspherical Coefficients of second order, fourth order, sixth order, eighth order and tenth order are $A_2$, $A_4$, $A_6$, $A_8$ and $A_{10}$, respectively, and a paraxial radius of curvature is r:

$$x = \frac{h^2/r}{1 + (1 - kh^2/r^2)^{1/2}} + \sum_{i=1}^{5} A_{2i} \cdot h^{2i}$$

wherein in the middle portion there are described in order from the left, values of the conical constant k and the aspherical coefficients of second order, fourth order, sixth order, eighth order and tenth order, $A_2$, $A_4$, $A_6$, $A_8$ and $A_{10}$ and wherein E–n means $10^{-n}$ in the values of aspherical coefficients;

wherein the lower portion in the table shows gaps between lens groups and feed amounts for focusing for each photographic distance of infinity and 600.0 mm at three zooming positions (f=28.8, 50.0, and 82.5 mm) between wide angle end and telephoto end;

wherein the bottom portion shows focal lengths of the lens groups, a lateral magnification of the second lens group at the wide angle end to infinity, and values corresponding to the conditions of the present invention;

wherein in the table $f_1$: a focal length of a first lens group;

$f_2$: a focal length of said second lens group;

$\beta_{2w}$: a lateral magnification of said second lens group at the wide angle end to infinity;

$f_3$: a focal length of a third lens group;

$f_4$: a focal length of said fourth lens group.

21. An internal focusing zoom lens system having the following lens specifications:

| | f = 36.0–131.0 | FN = 3.6–4.6 | | |
|---|---|---|---|---|
| r1 = 130.884 | d1 = 1.400 | n1 = 1.80518 | ν1 = 25.4 | L1 |
| r2 = 58.027 | d2 = 9.700 | n2 = 1.51860 | ν2 = 70.1 | L2 |
| r3 = –157.126 | d3 = .100 | | | |
| r4 = 39.031 | d4 = 5.500 | n3 = 1.61720 | ν3 = 54.0 | L3 |
| r5 = 91.293 | d5 = 2.639 | | | |
| r6 = 72.574 | d6 = 1.500 | n4 = 1.77279 | ν4 = 49.4 | L4 |
| r7 = 14.850 | d7 = 5.500 | | | |
| r8 = –25.147 | d8 = 2.700 | n5 = 1.80518 | ν5 = 25.4 | L5 |
| r9 = –18.882 | d9 = 1.200 | n6 = 1.74810 | ν6 = 52.3 | L6 |
| r10 = 70.764 | d10 = .500 | | | |
| r11 = 38.956 | d11 = 2.500 | n7 = 1.86074 | ν7 = 23.0 | L7 |
| r12 = 731.283 | d12 = 18.243 | | | |
| r13 = .000 | d13 = 1.300 | | | |
| r14 = 158.779 | d14 = 2.500 | n8 = 1.61272 | ν8 = 58.6 | L8 |
| r15 = –66.107 | d15 = .100 | | | |
| r16 = 26.962 | d16 = 6.000 | n9 = 1.51680 | ν9 = 64.1 | L9 |
| r17 = –25.683 | d17 = 1.500 | n10 = 1.80384 | ν10 = 33.9 | L10 |

-continued

| f = 36.0–131.0 | | FN = 3.6–4.6 | | |
|---|---|---|---|---|
| r18 = -11035.229 | d18 = 14.933 | | | |
| r19 = 36.870 | d19 = 4.500 | n11 = 1.51860 | v11 = 70.1 | L11 |
| r20 = -39.884 | d20 = 3.000 | | | |
| r21 = 233.745 | d21 = 1.500 | n12 = 1.79668 | v12 = 45.4 | L12 |
| r22 = 17.542 | d22 = 6.000 | n13 = 1.61266 | v13 = 44.4 | L13 |
| r23 = -72.148 | d23 = 3.000 | | | |
| r24 = -17.423 | d24 = 1.500 | n14 = 1.80384 | v14 = 33.9 | L14 |
| r25 = -32.268 | d25 = 42.711 | | | |

| r6 = .1000E + 01 | .0000 | -.2147E - 05 | -.2368E - 07 | .1275E - 09 | -.4418E - 12 |
|---|---|---|---|---|---|

| | pos (1) | pos (2) | pos (3) | pos (4) | pos (5) | pos (6) |
|---|---|---|---|---|---|---|
| f&b | 36.000 | 70.000 | 131.001 | -.050 | -.088 | -.124 |
| d0 | .000 | .000 | .000 | 659.974 | 643.460 | 635.061 |
| d5 | 2.639 | 17.599 | 29.195 | 1.554 | 15.088 | 22.327 |
| d12 | 18.243 | 10.076 | 2.206 | 19.327 | 12.587 | 9.074 |
| d18 | 14.932 | 12.214 | 11.088 | 14.932 | 12.214 | 11.088 |
| d25 | 42.712 | 55.151 | 62.950 | 42.712 | 55.151 | 62.950 |

| | F | (1) | (2) | (3) | (4) | R (mm) |
|---|---|---|---|---|---|---|
| 1 | 36.0000 | .0000 | 1.0847 | .0000 | .0000 | 800.00 |
| 2 | 70.0000 | .0000 | 2.5108 | .0000 | .0000 | 800.00 |
| 3 | 131.0000 | .0000 | 6.8683 | .0000 | .0000 | 800.00 |

| f1 = 71.987 | f2 = -16.498 | f3 = 44.471 | f4 = 80.047 | $\beta_{2w}$ = -.367 |
|---|---|---|---|---| the values obtained by a calculation in each condition
(1) 4.36
(2) 2.75
(3) 22.41
(4) 1.80 wherein in the table of specifications, f represents a focal length (mm), FN an F-number, r a radius of curvature of each lens plane (mm), d an interplanar gap between lenses (mm), n and v an index of refraction and an Abbe's number of each lens, L represents a lens disposed in the order from the object side, f&b represent focal distance of the entire system and magnification of the entire system, pos(4) represents closest position at wide angle end, pos(5) represents closest position at the middle position, pos(6) represents closest position at telephoto end;

wherein accompanying numerals to the characters represent orders counted from the object side;

wherein the middle portion of the table shows values of coefficients defining the shape of an aspherical surface formed on the lens plane $r_6$ on the object side in a second lens group;

wherein the aspherical surface is expressed by the following aspherical equation, if a height to the optical axis is h, a distance of a vertex of aspherical surface at h to the tangent plane is x, a conical constant is k, aspherical coefficients of second order, fourth order, sixth order, eighth order and tenth order are $A_2$, $A_4$, $A_6$, $A_8$ and $A_{10}$, respectively, and a paraxial radius of curvature is r:

$$x = \frac{h^2/r}{1 + (1 - kh^2/r^2)^{1/2}} + \sum_{i=1}^{5} A_{2i} \cdot h^{2i}$$

wherein in the middle portion there are described in order from the left, values of the conical constant k and the aspherical coefficients of second order, fourth order, sixth order, eighth order and tenth order, $A_2$, $A_4$, $A_6$, $A_8$ and $A_{10}$ and wherein E-n means $10^{-n}$ in the values of aspherical coefficients;

wherein the lower portion in the table shows gaps between lens groups and feed amounts for focusing for each photographic distance of infinity and 800.0 mm at three zooming positions (f=36.0, 70.0, and 131.0 mm) between wide angle end and telephoto end;

wherein the bottom portion shows focal lengths of the lens groups, a lateral magnification of the second lens group at the wide angle end to infinity, and values corresponding to the conditions of the present invention;

wherein in the table $f_1$: a focal length of a first lens group;

$f_2$: a focal length of said second lens group;

$\beta_{2w}$: a lateral magnification of said second lens group at the wide angle end to infinity;

$f_3$: a focal length of a third lens group;

$f_4$: a focal length of a fourth lens group.

22. An internal focusing zoom lens system having the following lens specifications:

| f = 28.8–103.0 | | FN = 3.5–4.9 | | |
|---|---|---|---|---|
| r1 = 150.000 | d1 = 1.600 | n1 = 1.86074 | v1 = 23.0 | L1 |
| r2 = 65.193 | d2 = 7.500 | n2 = 1.51680 | v2 = 64.1 | L2 |
| r3 = −201.063 | d3 = .100 | | | |
| r4 = 38.552 | d4 = 4.700 | n3 = 1.67025 | v3 = 57.6 | L3 |
| r5 = 92.468 | d5 = 2.014 | | | |
| r6 = 50.334 | d6 = 1.500 | n4 = 1.74443 | v4 = 49.5 | L4 |
| r7 = 11.892 | d7 = 6.000 | | | |
| r8 = −30.162 | d8 = 1.200 | n5 = 1.77279 | v5 = 49.4 | L5 |
| r9 = 21.082 | d9 = 2.500 | n6 = 1.86074 | v6 = 23.0 | L6 |
| r10 = 89.406 | d10 = .400 | | | |
| r11 = 26.791 | d11 = 2.300 | n7 = 1.86074 | v7 = 23.0 | L7 |
| r12 = 47.408 | d12 = 14.581 | | | |
| r13 = .000 | d15 = 1.500 | | | |
| r14 = 31.603 | d14 = 4.000 | n8 = 1.50137 | v8 = 56.5 | L8 |
| r15 = −56.214 | d15 = .100 | | | |
| r16 = 22.191 | d16 = 5.000 | n9 = 1.56384 | v9 = 60.8 | L9 |
| r17 = −24.447 | d17 = 2.000 | n10 = 1.80384 | v10 = 33.9 | L10 |
| r18 = 39.928 | d18 = 4.500 | | | |
| r19 = .000 | d19 = 6.093 | | | |
| r20 = 38.981 | d20 = 6.000 | n11 = 1.62041 | v11 = 60.3 | L11 |
| r21 = −25.650 | d21 = 2.300 | | | |
| r22 = −27.587 | d22 = 1.800 | n12 = 1.86994 | v12 = 39.8 | L12 |
| r23 = −93.762 | d23 = 43.415 | | | |

| | | | | | |
|---|---|---|---|---|---|
| r6 = .1000E + 01 | .0000 | −.1355E − 05 | −.1877E − 07 | −.5232E − 11 | −.7221E − 13 |
| r22 = .1000E + 01 | .0000 | −.2159E − 04 | −.3769E − 07 | −.1285E − 09 | .4333E − 12 |

| | pos (1) | pos (2) | pos (3) | pos (4) | pos (5) | pos (6) |
|---|---|---|---|---|---|---|
| f&b | 28.800 | 50.000 | 103.000 | −.040 | −.066 | −.120 |
| d0 | .000 | .000 | .000 | 678.896 | 663.592 | 642.203 |
| d5 | 2.014 | 13.477 | 27.014 | 1.316 | 12.289 | 24.153 |
| d12 | 14.581 | 8.142 | 1.416 | 15.280 | 9.329 | 4.277 |
| d19 | 6.093 | 4.215 | 3.065 | 6.093 | 4.215 | 3.065 |
| d23 | 43.415 | 55.574 | 71.302 | 43.415 | 55.574 | 71.302 |

| | F | (1) | (2) | (3) | (4) | R (mm) |
|---|---|---|---|---|---|---|
| 1 | 28.8000 | .0000 | .6983 | .0000 | .0000 | 800.00 |
| 2 | 50.0000 | .0000 | 1.1876 | .0000 | .0000 | 800.00 |
| 3 | 103.0000 | .0000 | 2.8609 | .0000 | .0000 | 800.00 |

| f1 = 74.000 | f2 = −14.650 | f3 = 39.000 | f4 = 51.000 | $\beta_{2w} = -.293$ |
|---|---|---|---|---| the values obtained by a calculation in each condition
(1) 5.05
(2) 2.73
(3) 17.86
(4) 1.31 wherein in the table of specifications, f represents a focal length (mm), FN an F-number, r a radius of curvature of each lens plane (mm), d an interplanar gap between lenses (mm), n and v an index of refraction and an Abbe's number of each lens, L represents a lens disposed in the order from the object side, f&b represent focal distance of the entire system and magnification of the entire system, pos(4) represents closest position at wide angle end, pos(5) represents closest position at the middle position, pos(6) represents closest position at telephoto end;

wherein accompanying numerals to the characters represent orders counted from the object side;

wherein the middle portion of the table shows values of coefficients defining the shape of an aspherical surface formed on the lens plane $r_6$ on the object side in a second lens group and the shape of an aspherical surface formed on the lens plane $r_{22}$ on the object side of negative lens $L_{12}$ in a fourth lens group;

wherein the aspherical surface is expressed by the following aspherical equation, if a height to the optical axis is h, a distance of a vertex of aspherical surface at h to the tangent plane is x, a conical constant is k, aspherical coefficients of second order, fourth order, sixth order, eighth order and tenth order are $A_2$, $A_4$, $A_6$, $A_8$ and $A_{10}$, respectively, and a paraxial radius of curvature is r:

$$x = \frac{h^2/r}{1 + (1 - kh^2/r^2)^{1/2}} + \sum_{i=1}^{5} A_{2i} \cdot h^{2i}$$

wherein in the middle portion there are described in order from the left values of the conical constant k and the aspherical coefficients of second order, fourth order, sixth order, eighth order and tenth order, $A_2$, $A_4$, $A_6$, $A_8$ and $A_{10}$ and wherein E−n means $10^{-n}$ in the values of aspherical coefficients;

wherein the lower portion of the table shows gaps between lens groups and feed amounts for focusing for each photographic distance of infinity and 800.0 mm at three zooming positions (f=28.8, 50.0, and 103.0 mm) between wide angle end and telephoto end;

wherein the bottom portion shows focal lengths of the lens groups, a lateral magnification of the second lens group at the wide angle end to infinity, and values corresponding to the conditions of the present invention;

wherein in the table $f_1$: a focal length of a first lens group;

$f_2$: a focal length of said second lens group;

$\beta_{2w}$: a lateral magnification of said second lens group at wide angle end to infinity;

$f_3$: a focal length of a third lens group;

$f_4$: a focal length of said fourth lens group.

* * * * *